United States Patent
Lidsky

(10) Patent No.: US 11,601,059 B2
(45) Date of Patent: Mar. 7, 2023

(54) DEEPLY INTEGRATED VOLTAGE REGULATOR ARCHITECTURES

(71) Applicant: Empower Semiconductor, Inc., Milpitas, CA (US)

(72) Inventor: David Lidsky, Oakland, CA (US)

(73) Assignee: Navitas Semiconductor Limited, Dublin (IE)

( * ) Notice: Subject to any disclaimer, the term of this patent is extended or adjusted under 35 U.S.C. 154(b) by 0 days.

(21) Appl. No.: 17/811,042

(22) Filed: Jul. 6, 2022

(65) Prior Publication Data
US 2023/0009673 A1   Jan. 12, 2023

Related U.S. Application Data

(63) Continuation of application No. 17/208,851, filed on Mar. 22, 2021, now Pat. No. 11,418,120, which is a
(Continued)

(51) Int. Cl.
*H02M 3/158* (2006.01)
*H02M 3/00* (2006.01)
*H02M 3/07* (2006.01)

(52) U.S. Cl.
CPC ......... *H02M 3/1584* (2013.01); *H02M 3/003* (2021.05); *H02M 3/07* (2013.01); *H02M 3/1586* (2021.05)

(58) Field of Classification Search
CPC .. H02M 3/003; H02M 3/1584; H02M 3/1586; H02M 3/07
See application file for complete search history.

(56) References Cited

U.S. PATENT DOCUMENTS 5,847,951 A * 12/1998 Brown ................. H01L 25/165
257/E25.031
6,396,137 B1 * 5/2002 Klughart ................ H01L 25/16
257/691
(Continued)

FOREIGN PATENT DOCUMENTS

CN          102611401 A        7/2012
DE      102013219793 A1        4/2014
(Continued)

OTHER PUBLICATIONS

Application No. DE112019006475.4, Office Action, dated Aug. 31, 2022, 13 pages.
(Continued)

*Primary Examiner* — Jue Zhang
(74) *Attorney, Agent, or Firm* — Kilpatrick Townsend & Stockton LLP

(57) ABSTRACT

A system is disclosed. The system includes a substrate, and a first chip on the substrate, where a load circuit is integrated on the first chip. The system also includes a second chip on the substrate, where a power delivery circuit is configured to deliver current to the load circuit according to a regulated voltage at a node. The power delivery circuit includes a first circuit configured to generate an error signal based at least in part on the regulated voltage, and a voltage generator including power switches configured to modify the regulated voltage according to the error signal, where the first circuit of the power delivery circuit is integrated on the first chip, and where at least a portion of the power switches of the power delivery circuit are integrated on the second chip.

20 Claims, 25 Drawing Sheets

Related U.S. Application Data continuation of application No. 16/727,909, filed on Dec. 26, 2019, now Pat. No. 10,958,172.

(60) Provisional application No. 62/785,143, filed on Dec. 26, 2018.

(56) References Cited

U.S. PATENT DOCUMENTS

| | | | |
|---|---|---|---|
| 6,469,895 B1* | 10/2002 | Smith | H01L 23/467 257/691 |
| 6,791,846 B2* | 9/2004 | Smith | H05K 1/141 361/780 |
| 8,288,846 B2* | 10/2012 | Narendra | H01L 25/0657 257/E23.08 |
| 9,300,210 B1 | 3/2016 | Lidsky et al. | |
| 9,373,571 B2 | 6/2016 | Denison et al. | |
| 9,413,252 B2 | 8/2016 | Xu et al. | |
| 9,935,076 B1* | 4/2018 | Ramachandran | H01L 25/18 |
| 10,958,172 B2 | 3/2021 | Lidsky | |
| 11,418,120 B2 | 8/2022 | Lidsky | |
| 2009/0174262 A1 | 7/2009 | Martin et al. | |
| 2009/0322414 A1* | 12/2009 | Oraw | H02M 3/07 327/537 |
| 2014/0184180 A1 | 7/2014 | Kronmueller | |
| 2014/0306648 A1 | 10/2014 | Le et al. | |
| 2014/0306673 A1* | 10/2014 | Le | H02J 7/00 323/266 |
| 2016/0036339 A1* | 2/2016 | Kikuchi | H02M 3/33592 363/21.14 |
| 2016/0064313 A1 | 3/2016 | Denison et al. | |
| 2016/0126836 A1* | 5/2016 | Schmitz | H02M 3/157 323/271 |
| 2016/0179181 A1 | 6/2016 | Doyle et al. | |
| 2017/0331371 A1* | 11/2017 | Parto | H02M 3/33561 |

FOREIGN PATENT DOCUMENTS

| | | |
|---|---|---|
| DE | 102013114588 A1 | 8/2014 |
| DE | 102013114620 A1 | 9/2014 |
| KR | 20120110059 A | 10/2012 |
| KR | 20150069869 A | 6/2015 |

OTHER PUBLICATIONS

U.S. Appl. No. 16/727,909, Non-Final Office Action, dated May 29, 2020, 12 pages.

U.S. Appl. No. 16/727,909, Notice of Allowance, dated Nov. 9, 2020, 8 pages.

U.S. Appl. No. 17/208,851, Notice of Allowance, dated Mar. 29, 2022, 9 pages.

U.S. Appl. No. 17/208,851, "Supplemental Notice of Allowability", dated Jul. 13, 2022, 2 pages.

Application No. CN201980092459.X, Office Action, dated Feb. 28, 2022, 10 pages.

Application No. PCT/US2019/068634, International Preliminary Report on Patentability, dated Jul. 8, 2021, 7 pages.

Application No. PCT/US2019/068634, International Search Report and Written Opinion, dated Apr. 29, 2020, 10 pages.

* cited by examiner

Type 2

DEEPLY INTEGRATED VOLTAGE REGULATOR ARCHITECTURES

CROSS-REFERENCES TO RELATED APPLICATIONS

This application is a continuation of U.S. patent application Ser. No. 17/208,851, filed Mar. 22, 2021, entitled DEEPLY INTEGRATED VOLTAGE REGULATOR ARCHITECTURES, which is a continuation of U.S. patent application Ser. No. 16/727,909, filed Dec. 26, 2019, entitled DEEPLY INTEGRATED VOLTAGE REGULATOR ARCHITECTURES, which claims the benefit of U.S. Provisional Application No. 62/785,143, filed Dec. 26, 2018, entitled INTEGRATED VOLTAGE REGULATOR, the disclosures of all of which are incorporated herein by reference in their entirety.

FIELD OF THE INVENTION

The present application generally pertains to power delivery circuits, and more particularly to circuits which deliver power to a load using multiple phases.

BACKGROUND OF THE INVENTION

New circuits have increased power needs. Therefore, power delivery systems having improved control schemes are needed.

BRIEF SUMMARY OF THE INVENTION

One inventive aspect is a system. The system includes a substrate, and a first chip on the substrate, where a load circuit is integrated on the first chip. The system also includes a second chip on the substrate, where a power delivery circuit is configured to deliver current to the load circuit according to a regulated voltage at a node. The power delivery circuit includes a first circuit configured to generate an error signal based at least in part on the regulated voltage, and a voltage generator including power switches configured to modify the regulated voltage according to the error signal, where the first circuit of the power delivery circuit is integrated on the first chip, and where at least a portion of the power switches of the power delivery circuit are integrated on the second chip.

DETAILED DESCRIPTION

Particular embodiments of the invention are illustrated herein in conjunction with the drawings.

Figure 1:
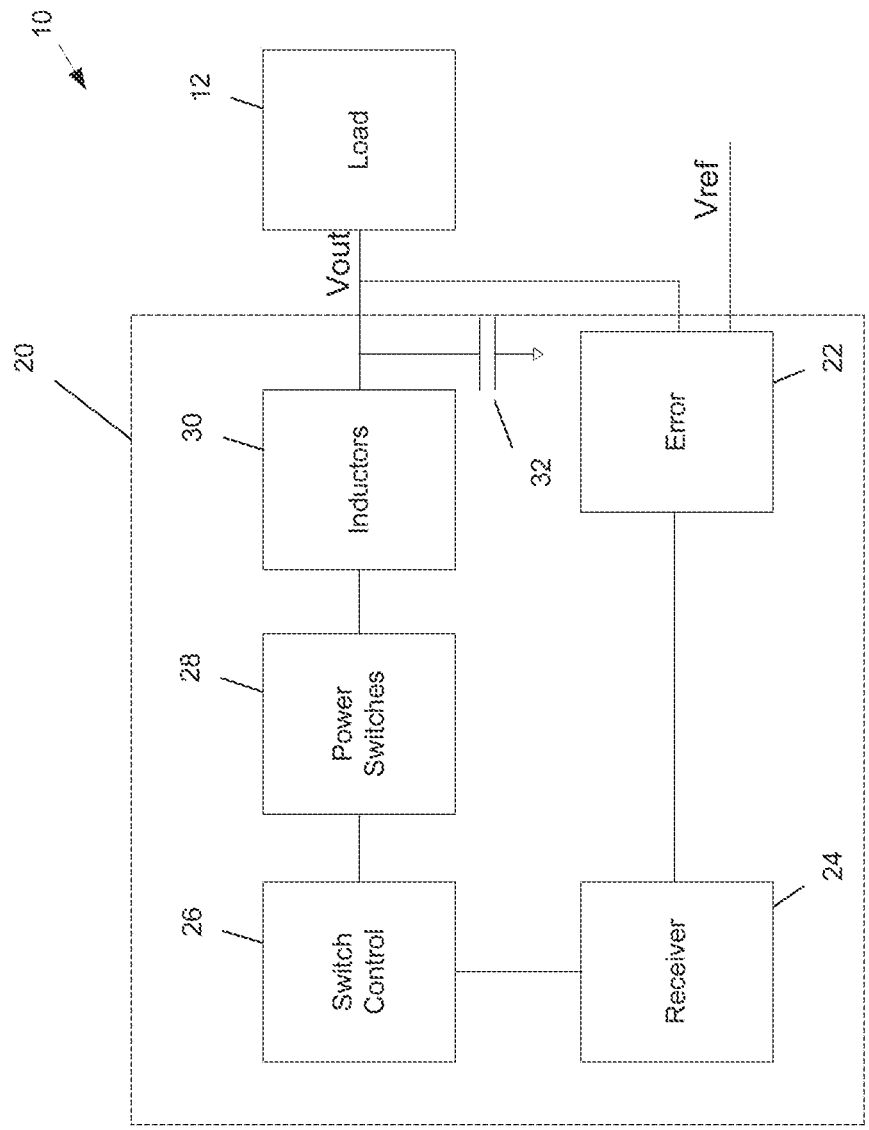
FIG. 1 depicts an illustrative simplified schematic of a system.

FIG. 1 depicts an illustrative simplified schematic of system 10 including a power delivery circuit 20 that is coupled to a load 12, which receives power from power delivery circuit 20. For example, load 12 may receive current from power delivery circuit 20 via node Vout, where the voltage at node Vout is regulated by power delivery circuit 20. Accordingly, as understood by those skilled in the art, load 12 is a load for power delivery circuit 20.

The load 12 is integrated on a first semiconductor chip or die. A first portion of the power delivery circuit 20 is also integrated on the first semiconductor chip or die. In addition, a second portion of the power delivery circuit 20 is integrated on a second semiconductor chip or die.

In some embodiments, as described above, the load 12 can be any type of integrated circuit (e.g., a processor, DSP, AI computation, communication) and may contain digital and analog circuits. The load 12 may interface with the power delivery circuit 20. The means of communication can include a communication bus coupled to either or both of the first and second portions of power delivery circuit 20. For example, the load 12 can include any portion of a monitoring or control system that interfaces with one or more portions of the power delivery circuit 20. The load 12 can also store information associated with the power delivery circuit 20 in a memory and communicate data associated with the power delivery circuit 20 to an external device.

The load 12, can include circuitry that configures the power delivery circuit 20. For example in can communicate the desired output voltage. It may also configure properties of the power delivery circuit 20 including compensation information, startup and shutdown information etc. The load can communicate to the power delivery circuit on either the second die or the first die. A dedicated communication connection may also be connected between parts of the power delivery circuit 20 on the first and second die.

Communication between circuits on the same die can often be much faster. Being able to change the voltage quickly can increase throughput and save power so one implementation enables the load to quickly change the voltage desired by communicating with the portion of the power delivery circuit on the first die. In some implementations, the desired voltage may also be communicated to the portion of the power delivery circuit 20 on the second die. This can enable optimal optimization of that circuitry. Other information that can be communicated to the power delivery circuit 20 include power states of the load, timing and rate of startup and shut down of the power delivery circuits. Other information that can be communicated from the power delivery circuit 20, to the load 12 include status of the regulator, information about the output voltage, how much current is being provided, temperature and any fault conditions. This information may be used by the receiving circuit or component to modify the functionality of the receiving component. For example, the information may be used by the receiving circuit or component to modify the voltage generated by power delivery circuit 20.

The power delivery circuit 20 includes error circuit 22, error management circuit 24, switch control circuit 26, power switches 28, inductors 38, and capacitor 32. In some embodiments, the power delivery circuit 20 forms or partly forms a voltage regulator circuit.

Error circuit 22 is configured to receive a reference voltage at node or bus Vref. The reference voltage is generated by another circuit, and has a voltage value equal or substantially equal to a target or desired voltage value of the voltage at node Vout, which is generated by power delivery circuit 20 for load 12, such that the power delivery circuit 20 delivers current to the load 12 at a regulated voltage at node Vout, where the regulated voltage at node Vout is determined based on the reference voltage at node or bus Vref.

Error circuit 22 is configured to also receive the voltage at node Vout generated by power delivery circuit 20. Based at least on the difference between the voltage at node Vout and the reference voltage, error circuit 22 generates an error signal which causes the power delivery circuit 20 to generate the voltage at node Vout so that the difference between the voltage at node Vout and the reference voltage is minimized, as understood by those of skill in the art.

In some embodiments, error circuit 22 comprises an operational amplifier having gain, bandwidth, and stability characteristics which contribute to stable generation of the voltage at node Vout.

Error circuit 22 may include an analog-to-digital converter configured to generate a digital representation of the difference between the analog voltage at node Vout and the analog reference voltage at node Vref as the error signal.

In some embodiments, error circuit 22 comprises an analog-to-digital converter configured to generate a digital representation of the voltage at node Vout, and a digital difference or subtraction circuit configured to receive the digital representation of the voltage at node Vout and to generate a digital error signal based on the difference between the digital representation of the voltage at node Vout and the reference voltage, as represented by a digital word received by error circuit 22 at node or bus Vref.

Alternatively, in some embodiments, error circuit 22 comprises an analog amplifier configured to receive the analog voltage at node Vout and an analog reference voltage at node Vref, and to generate an analog error signal. In some implementations, the analog error signal represents the difference between the analog voltage at node Vout and the analog reference voltage at node Vref. In some implementations, the analog error signal represents the difference between the analog voltage at node Vout and the analog reference voltage at node Vref multiplied by a gain factor. In some implementations the amplifier can include compensation as known in the art. For example the amplifier can be configured to have proportional, integral and/or differential processing of the analog voltage at node Vout. In other implementations the error circuit 22 can be, or include with other circuits, a comparator to generate an error signal indicating whether the analog voltage at node Vout is greater than or less than a reference voltage, such as the reference voltage at node Vref.

At least a portion of error circuit 22 may be integrated on the first semiconductor chip or die, whereon the load 12 or at least a portion of the load 12 is also integrated. In some embodiments, all of error circuit 22 is integrated on the first semiconductor chip or die. In some embodiments, at least a portion of error circuit 22 is integrated on the second semiconductor chip or die. In some embodiments, at least a portion of error circuit 22 is integrated on the second semiconductor chip or die with one or more other portions of the power delivery circuit 20.

It may be advantageous to integrate at least a portion of error circuit 22 on the first semiconductor chip or die at least because error circuit 22 or at least a portion of error circuit 22 comprises a sensor configured to sense the voltage at node Vout for power delivery circuit 20. As understood by those of skill in the art, power delivery circuit 20 regulates the voltage at node Vout based on the difference between the voltage at node Vout and the voltage reference voltage at node Vref. Accordingly, it is advantageous for the sensor to be as close as possible to the optimum point of sensing the voltage at node Vout, which is at the load, as understood by those of skill in the art, so that the sensed value is as accurate as possible. As understood by those of skill in the art, distance between the optimum point and the sensed point at node Vout allows for the sensed voltage to be different from the actual voltage at least because of, for example, noise and IR drop.

Error management circuit 24 is configured to receive the output(s) of error circuit 22 and to generate one or more signals based on the output of error circuit 22. The one or more signals generated by error management circuit 24 influence the voltage at node Vout so as to minimize the difference between the voltage at node Vout and the reference voltage, as understood by those of skill in the art.

In some embodiments, the output of error management circuit 24 is a representation of the difference between the voltage at node Vout and the reference voltage.

The output of error management circuit 24 may include one or more of an analog voltage, a digital word, and another signal type. For example, in some embodiments, the output of error management circuit 24 may include a series of digital pulses, where the frequency of the pulses corresponds at least with the relationship (e.g. difference) between the voltage at node Vout and the reference voltage. In alternative embodiments, other signal mechanisms, for example encoding the difference between the voltage at node Vout and the reference voltage, are generated by error management circuit 24.

In some embodiments, the error management circuit 24 receives a representation of the current being provided to the load, for example, from the load 12, the error circuit 22, or switch control circuit 26, and the output of the error management circuit 24 is determined based on the current being drawn from or supplied to the load and a representation of the voltage at node Vout.

At least a portion of error management circuit 24 may be integrated on the first semiconductor chip or die, whereon the load 12 or at least a portion of the load 12 is also integrated. In some embodiments, all of error management circuit 24 is integrated on the first semiconductor chip or die. In some embodiments, at least a portion of error management circuit 24 is integrated on the second semiconductor chip or die. In some embodiments, at least a portion of error management circuit 24 is integrated on the second semiconductor chip or die with one or more other portions of the power delivery circuit 20. In some embodiments, all of error management circuit 24 is integrated on the second semiconductor chip or die.

Switch control circuit 26 is configured to receive the output of error management circuit 24 and to generate one or more signals based on the received output of error management circuit 24. The one or more output signals generated by the switch control circuit 26, for example, with power FET drivers, influences the voltage at node Vout so as to minimize the difference between the voltage at node Vout and the reference voltage, as understood by those of skill in the art.

In some embodiments, the output of switch control circuit 26 is based on the difference between the voltage at node Vout and the reference voltage. In some embodiments, the output of switch control circuit 26 is based additionally or alternatively on a current delivered to load 12.

The output of switch control circuit 26 may include signals from power FET drivers which control the conductivity states of the power switches 28. For example, in some embodiments, the output of switch control circuit 26 may include multiple series of digital pulses, where the frequency and the timing relationship among the multiple series corresponds with at least the difference between the voltage at node Vout and the reference voltage. In alternative embodiments, other signal mechanisms, for example corresponding with the difference between the voltage at node Vout and the reference voltage, are generated by switch control circuit 26.

In some embodiments, the switch control circuit 26 includes current sense circuitry, which senses the current through power switches 28. As understood by those of skill in the art, the sensed current may be used to influence when the power switches 28 should switch.

In some embodiments, switch control circuit 26 generates signals representing the current being delivered to the load for either or both of error circuit 22 and error management circuit 24.

At least a portion of switch control circuit 26 may be integrated on the first semiconductor chip or die, whereon the load 12 or at least a portion of the load 12 is also integrated. In some embodiments, all of switch control circuit 26 is integrated on the first semiconductor chip or die. In some embodiments, at least a portion of switch control circuit 26 is integrated on the second semiconductor chip or die. In some embodiments, at least a portion of switch control circuit 26 is integrated on the second semiconductor chip or die with one or more other portions of the power delivery circuit 20. In some embodiments, all of switch control circuit 26 is integrated on the second semiconductor chip or die.

Power switches 28 are configured to receive the output of switch control circuit 26 and to cooperatively generate the voltage at node Vout with inductor(s) 30 and capacitor 32, wherein the generated voltage is based on the received output of switch control circuit 26. Accordingly, power switches 28, inductor(s) 30, and capacitor 32 collectively form a voltage generator driven and controlled by the output of switch control circuit 26. Therefore, the output of switch control circuit 26 causes the power switches 28, inductor(s) 30, and capacitor 32 to influence the voltage at node Vout so as to minimize the difference between the voltage at node Vout and the reference voltage, as understood by those of skill in the art.

In some embodiments, power switches 28 are configured to selectively, alternately, and repetitively connect inductor(s) 30 to a positive power supply and to a negative power supply. In some embodiments, switch control circuitry 26, power switches 28, inductor(s) 30, and capacitor 32 are arranged so as to form a synchronous buck converter topology, a full-bridge converter topology, a boost topology, a buck-boost or another type of power regulator circuit topology.

Power switches 28 may be integrated on the second semiconductor chip or die. In some embodiments, power switches 28 are discrete power devices or are integrated on another semiconductor die.

Inductors 38 and capacitor 32 collectively form an LC filter, as understood by those of skill in the art. In some embodiments, capacitor 32 is implemented as multiple physical capacitors connected in parallel. Inductors 38 and capacitor 32 or portions of inductors 38 and capacitor 32 may be formed on either of the first and second semiconductor chips or die. In some embodiments, the output capacitor 32 is only located on the first semiconductor die. In some embodiments, the output capacitor 32 is a combination of capacitors some on the first semiconductor die, with some outside of the first semiconductor die. In some embodiments, either or both of inductors 38 and capacitor 32 are placed within a multi-chip or multi-die package carrying the first and second semiconductor chips or die, and are not integrated on either of the first and second semiconductor chips or die. In some embodiments, either or both of inductors 38 and capacitor 32 are placed outside of a multi-chip or multi-die package carrying the first and second semiconductor chips or die.

In some embodiments, power delivery system 20 is multiphase. In such embodiments, inductor(s) 30 comprises multiple inductors, each connected to capacitor 32 and to a distinct pair of power switches of power switches 28. Each distinct pair of power switches of power switches 28 is separately controlled by switch control circuitry 26 such that multi-phase power is delivered by power switches 28, inductor(s) 30, and capacitor 32 to load 12.

In some embodiments, error management circuit 24 and switch control circuit 26 are integrated into a loop control circuit having the input functionality of error management circuit 24 and the output functionality of switch control circuit 26.

In such embodiments, at least a portion of the loop control circuit may be integrated on the first semiconductor chip or die, whereon the load 12 or at least a portion of the load 12 is also integrated. In some embodiments, all of the loop control circuit is integrated on the first semiconductor chip or die. In some embodiments, at least a portion of the loop control circuit is integrated on the second semiconductor chip or die. In some embodiments, at least a portion of the loop control circuit is integrated on the second semiconductor chip or die with one or more other portions of the power delivery circuit 20.

As discussed above, at least in some embodiments, error circuit 22 receives analog voltages at nodes Vout and Vref, and switch control circuit 26 generates control signals at for power switches 28. Accordingly, error circuit 22, error management circuit 24, and switch control circuit 26 may be considered as collectively generating the control signals. Accordingly, error circuit 22, error management circuit 24, and switch control circuit 26 may be collectively considered a control signal generator.

In such embodiments, at least a portion of the collective control signal generator control signal generator may be integrated on the first semiconductor chip or die, whereon the load 12 or at least a portion of the load 12 is also integrated. In some embodiments, all of the collective control signal generator is integrated on the first semiconductor chip or die. In some embodiments, at least a portion of the collective control signal generator is integrated on the second semiconductor chip or die. In some embodiments, at least a portion of the collective control signal generator is integrated on the second semiconductor chip or die with one or more other portions of the power delivery circuit 20.

As understood by those of skill in the art, the collective control signal generator converter may be segregated into an analog circuit portion and a digital circuit portion. At least a portion of the analog circuit portion may be integrated on the first semiconductor chip or die, whereon the load 12 or at least a portion of the load 12 is also integrated. In some embodiments, all of the analog circuit portion is integrated on the first semiconductor chip or die, for example, such that a digital signal is sent from the first semiconductor chip or die to the second semiconductor chip or die. In some embodiments, at least a portion of the analog circuit portion is integrated on the second semiconductor chip or die. In some embodiments, at least a portion of the analog circuit portion is integrated on the second semiconductor chip or die with one or more other portions of the power delivery circuit 20.

In some embodiments, the signal from the first die to the second die indicates when a phase should start a new pulse. The second die may take this signal and decide which phase should switch next so as to minimize the voltage ripple at the output voltage at the load 12.

In some embodiments, system 10 also includes a reference voltage generation circuit (not shown), which is configured to generate the reference voltage at node Vref.

In such embodiments, at least a portion of the reference voltage generation circuit may be integrated on the first semiconductor chip or die, whereon the load 12 or at least a portion of the load 12 is also integrated. In some embodiments, all of the reference voltage generation circuit is integrated on the first semiconductor chip or die. In some embodiments, at least a portion of the collective analog-to-digital converter is integrated on the second semiconductor chip or die. In some embodiments, at least a portion of the reference voltage generation circuit is integrated on the second semiconductor chip or die with one or more other portions of the power delivery circuit 20.

In some embodiments, current provided to load 12 may additionally or alternatively be used in any of error circuit 22, error management circuit 24, and switch control circuit 26 to generate the control signals for the power switches 28. Sensing the current provided to load 12 can be done in either of the first and second die. The current provided to load 12 may also be sensed by sensing the voltage across the inductor(s) 30.

Figure 2:
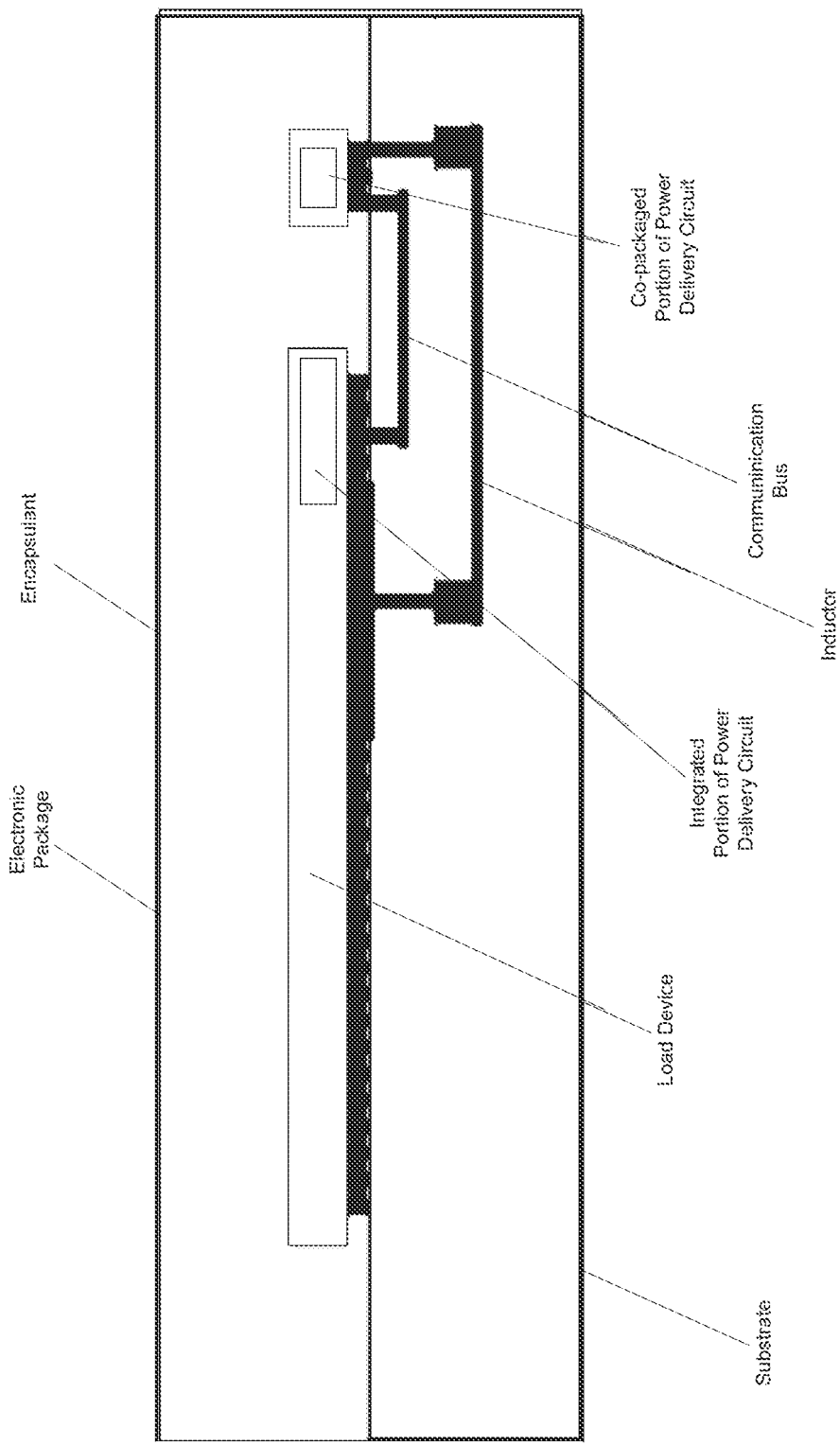
FIG. 2 is a cross-sectional schematic view of a IC package.

FIG. 2 is a cross-sectional schematic view of a IC package 50 having power delivery system 20 and load 12. As shown, IC package 50 includes first and second die 51 and 52 on substrate 55. As understood by those of skill in the art, first and second die 51 and 52 may be electrically connected to one another, for example, through connectors on the first and second die and metal in the a package or printed circuit board. Additionally, first and second die 51 and 52 may be electrically connected to conductive pins or leads which extend so as to be exposed to components external to package 50 with one or more bond wires or other conductors. For example, first and second die 51 and 52 may be electrically connected with a communication bus.

Load 12 or at least a portion of load 12 may be integrated on the first die 51. In addition, power switches 28 may be integrated on the second die 52.

In some embodiments, a first portion of error circuit 22 is integrated on the first die 51, where a second portion of error circuit 22 is integrated on the second die 52 along with error management circuit 24 and switch control circuit 26.

In some embodiments, error circuit 22 is entirely integrated on the first die 51, and error management circuit 24 and switch control circuit 26 are integrated on the second die 52.

In some embodiments, a first portion of error management circuit 24 is integrated on the first die 51 along with error circuit 22, where a second portion of error management circuit 24 is integrated on the second die 52 along with switch control circuit 26.

In some embodiments, error circuit 22 and error management circuit 24 are entirely integrated on the first die 51, and switch control circuit 26 is integrated on the second die 52.

In some embodiments, a first portion of switch control circuit 26 is integrated on the first die 51 along with error management 24 and error circuit 22, where a second portion of switch control circuit 26 is integrated on the second die 52.

In some embodiments, switch control circuit 26, error circuit 22, and error management circuit 24 are entirely integrated on the first die 51.

In some embodiments, the inductors 30 are integrated on the second die 52.

In some embodiments, the inductors 30 are external to both the first and second die 51 and 52. For example, the inductors 30 may be formed by a metal on substrate 55 external to both the first and second die 51 and 52, and electrically connected to either or both of the first and second die 51 and 52. Alternatively, the inductors 30 may be connected external to package 50, and electrically connected to either or both of the first and second die 51 and 52.

In some embodiments, the capacitor 32 is integrated on the second die 52.

In some embodiments, the capacitor 32 is external to both the first and second die 51 and 52. For example, the capacitor 32 may be connected to substrate 55 external to both the first and second die 51 and 52, and electrically connected to either or both of the first and second die 51 and 52. Alternatively, the capacitor 32 may be connected external to package 50, and electrically connected to first die 51 and/or to second die 52.

In some embodiments, the capacitor 32 is integrated solely on the second die 52.

In some embodiments power switches 28 are on integrated on the second die 52. In some embodiments, for example, in embodiments using a boost regulator configuration, the power switches 28 are partially integrated on the second die 52, and are partially integrated on the first die 51.

In some embodiments only the power switches of the power delivery system 20 are integrated on the second die 52, and the remainder of the power delivery system 20 is integrated on the first die 51.

A separate fabrication process can be used to form the first and second die 51 and 52, where the fabrication process of the first die is optimized for forming power semiconductors. This is one of the advantages of the disclosed allocations of circuitry onto the first and second die 51 and 52. Circuitry that is preferentially fast can be integrated on to the second die 52, where the process may be better for fast operation. The first die 51 can be in a process that is optimized for creating power switches.

In some embodiments, first and second die are positioned within 200-500 microns of one another. In some embodiments, the first and second die are close enough that the first and second die use high speed communications that enables the power delivery circuit 20 to deliver power to the load 12 without a capacitor 32 external to the first and second die or without a capacitor 32 external to package 50. For example, capacitor 32 may be formed on the first die, on the second die, or within package 50 external to the first and second die. In some embodiments, capacitor 32 within the electronic package can be in the form of one or more discrete capacitors positioned within the electronic package.

In some embodiments the inductor that couples power to the load can be an air-core inductor, that is, an inductor without a magnetic core. Various embodiments can have a reduced need for capacitance of capacitor 32, as compared to traditional architectures. Some embodiments have substantially reduced parasitics and delays, as compared to traditional architectures, allowing the power delivery circuit 20 to respond much faster to transient power requirements of the load 12.

The load 12 and/or the portion of the power delivery circuit 20 integrated on the first die can communicate with and control the portion of the power delivery circuit 20 integrated on the second die via a communication bus. In some embodiments the communication bus is analog while in other embodiments it is digital, including but not limited to an I2C bus. In some configurations it is a high speed digital bus. In various embodiments the communication bus can be bi-directional such that the load 12 and/or the portion of the power delivery circuit 20 integrated on the first die can send signals to the portion of the power delivery circuit 20 integrated on the second die, and the portion of the power delivery circuit 20 integrated on the second die can send signals to the load 12 and/or the portion of the power delivery circuit 20 integrated on the first die. In some embodiments, the communication bus has one, two, three, four or more separate conductors. In some embodiments the communication bus has one or more of the following architectures and/or features:

In some multiphase embodiments, the number of phases of the power delivery circuit 20 is not communicated to the load 12 and/or the portion of the power delivery circuit 20 integrated on the first die.

In some embodiments, the load 12 and/or the portion of the power delivery circuit 20 integrated on the first die sends a signal to the portion of the power delivery circuit 20 integrated on the second die every time a pulse should be started (e.g., PWM Signal, off to high side on, or low side on to high side on, high side on to low side, or start a resonant pulse).

In some embodiments, the load 12 and/or the portion of the power delivery circuit 20 integrated on the first die sends a signal to the portion of the power delivery circuit 20 integrated on the second die indicating which phase should be triggered next.

In some embodiments, the load 12 and/or the portion of the power delivery circuit 20 integrated on the first die sends a signal to the portion of the power delivery circuit 20 integrated on the second die indicating information related to the output voltage. That information can contain one or more of: an error voltage, an absolute voltage, a current of the load, a digital representation of the output voltage, a digital representation of the error voltage, a processed (i.e., compensated version) of the error voltage that is an output of the compensation circuit, or any other information.

In some embodiments, the load 12 and/or the portion of the power delivery circuit 20 integrated on the first die sends a signal to or receives a signal from the portion of the power delivery circuit 20 integrated on the second die indicating the value of the reference voltage at node Vref.

In some embodiments, the load 12 and/or the portion of the power delivery circuit 20 integrated on the first die sends a signal to the portion of the power delivery circuit 20 integrated on the second die indicating status information (e.g., how much current is being delivered, temperature, etc.).

In some embodiments, the load 12 and/or the portion of the power delivery circuit 20 integrated on the first die sends a signal to the portion of the power delivery circuit 20 integrated on the second die indicating configuration information (e.g., desired voltage, compensation settings, power saving settings).

In some embodiments, the load 12 and/or the portion of the power delivery circuit 20 integrated on the first die sends a signal to or receives a signal from the portion of the power delivery circuit 20 integrated on the second die with information including:

A desired power state of the portion of the power delivery circuit 20 integrated on the first die (e.g. off, low power, high power, voltage of the integrated portion of the power delivery circuit).

On and off signals for each phase and/or each individual power switch integrated on the second die.

The state of one or more portions of the power delivery circuit 20 (e.g., current, temperature, voltage, current, error state, etc.).

Figure 3:
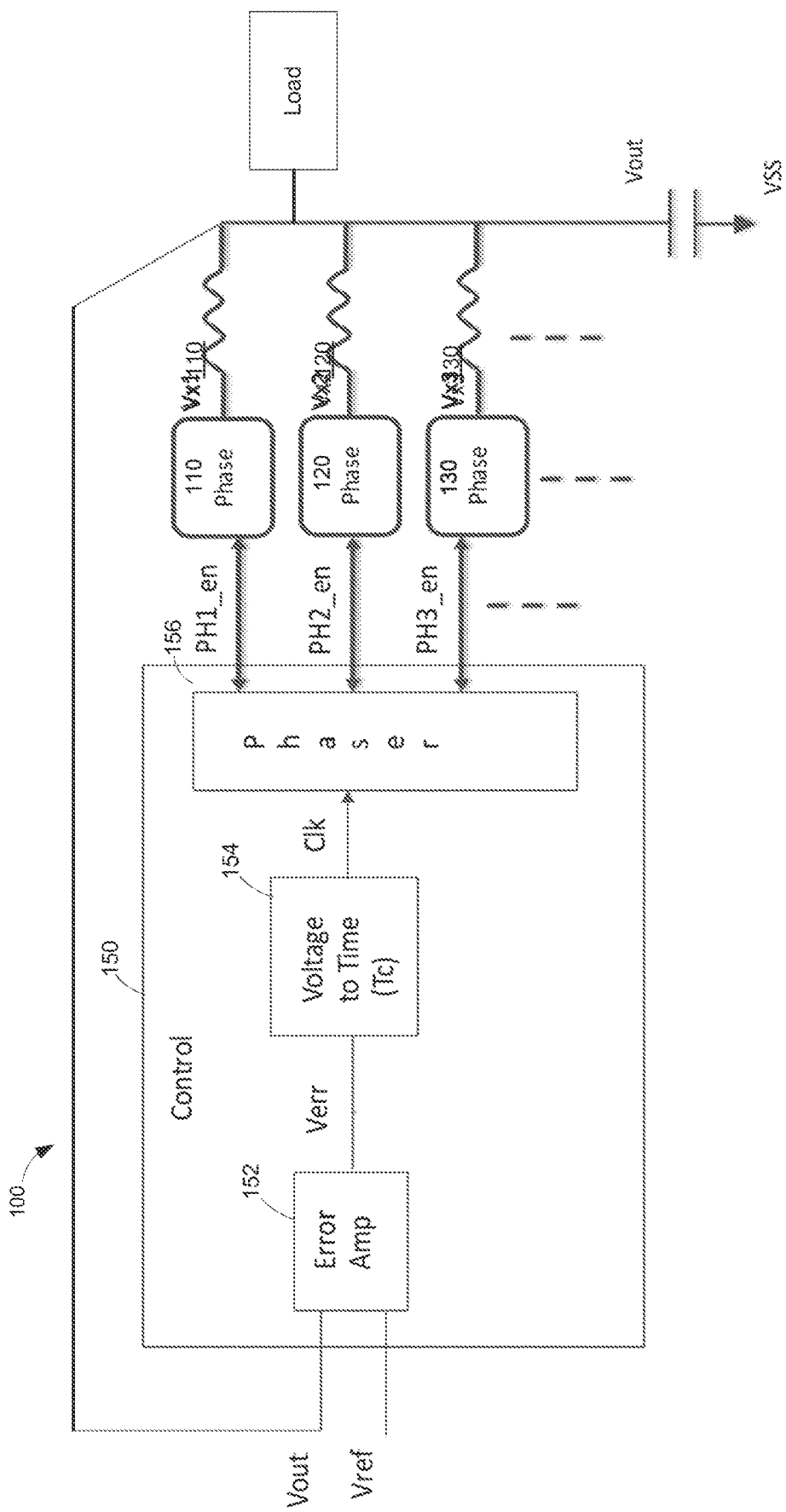
FIG. 3 depicts an illustrative simplified schematic of a power delivery control circuit that can be used in a variety of electronic systems.

FIG. 3 is a schematic illustration of a system including power delivery circuit 100 and load 175. The system of FIG. 3 is an example embodiment of system 10 of FIG. 1. Other embodiments can be used.

FIG. 3 depicts an illustrative simplified schematic of a power delivery control circuit 100 that can be used in a variety of electronic systems. As shown in FIG. 1, the power delivery control circuit includes three phases 110, 120, and 130, however in other embodiments the power delivery control circuit can have from one to any number of phases. Phases 110, 120, and 130 are collectively an embodiment of power switches 28 or power switches 28 and switch control 26 of system 10. In some embodiments each phase can include one or more solid-state switches that regulate power delivered from a power source to a load. In various embodiments each phase can include an arrangement of sequentially coupled solid-state switches while in further embodiments each phase can include a pair of solid-state switches arranged in a synchronous buck converter topology, while in yet further embodiments each phase can be a full-bridge or other type of power regulator circuit.

As further illustrated in FIG. 3, each phase is coupled to and controlled by a control circuit 150. The control circuit 150 includes Vout and Vref nodes as inputs into an error amplifier 152. Error amplifier 152 is an embodiment of error circuit 22 of system 10. The error amplifier 152 generates an error voltage at node Verr based on the difference between Vout and Vref inputs. The error voltage can be used as an input into a Voltage to Time circuit 154, which is an embodiment of error management circuit 24 of system 10. In some embodiments, instead of using the error voltage as an input to the Voltage to Time circuit 154, a signal that is derived from the error voltage can be used as an input. In one example the signal can be derived from a Type 2 compensation network. The Voltage to Time circuit 154 is configured to convert the error voltage, or the signal derived from the error voltage, to a controlled time (Tc). In some embodiments, the Voltage to Time circuit 154 sends a series of clock pulses to a phaser circuit 156, where the time between the beginning of the pulses is equal or substantially equal to the controlled time (Tc). Phase circuit 156 is an embodiment of switch control circuit 26.

When the phaser circuit 156 receives each clock pulse signal, it determines which of phases 110, 120, and 130 to trigger next and sends a trigger signal to the determined phase. For example, at very light loads only phase 110 may be repetitively triggered so the phaser circuit 156 only sends trigger voltages to phase 110 each time it receives a clock pulse signal. However, at large loads phase 120 may need to be triggered before all of the current or energy in phase 110 is delivered to the load so the phaser circuit 156 sends a first trigger signal to phase 110 and a second trigger signal to phase 120, as illustrated in more detail herein.

In some embodiments, relatively large error voltages (e.g., when Vout is lower than Vref) indicate that more power is required at the load to raise Vout so the Voltage to Time Circuit decreases Tc so there is less time between triggering the phases 110, 120, and 130. Similarly, when Vout is near Vref there is a relatively smaller error voltage that corresponds to an increase in Tc and a longer time between sequential phases, as described in more detail below.

In some configurations, the logic and control circuitry for one or more of the Voltage to Time circuit 154, the phaser circuit 156, and the phases 110, 120, and 130 are physically combined with or intermixed with or near one another.

Figure 4:
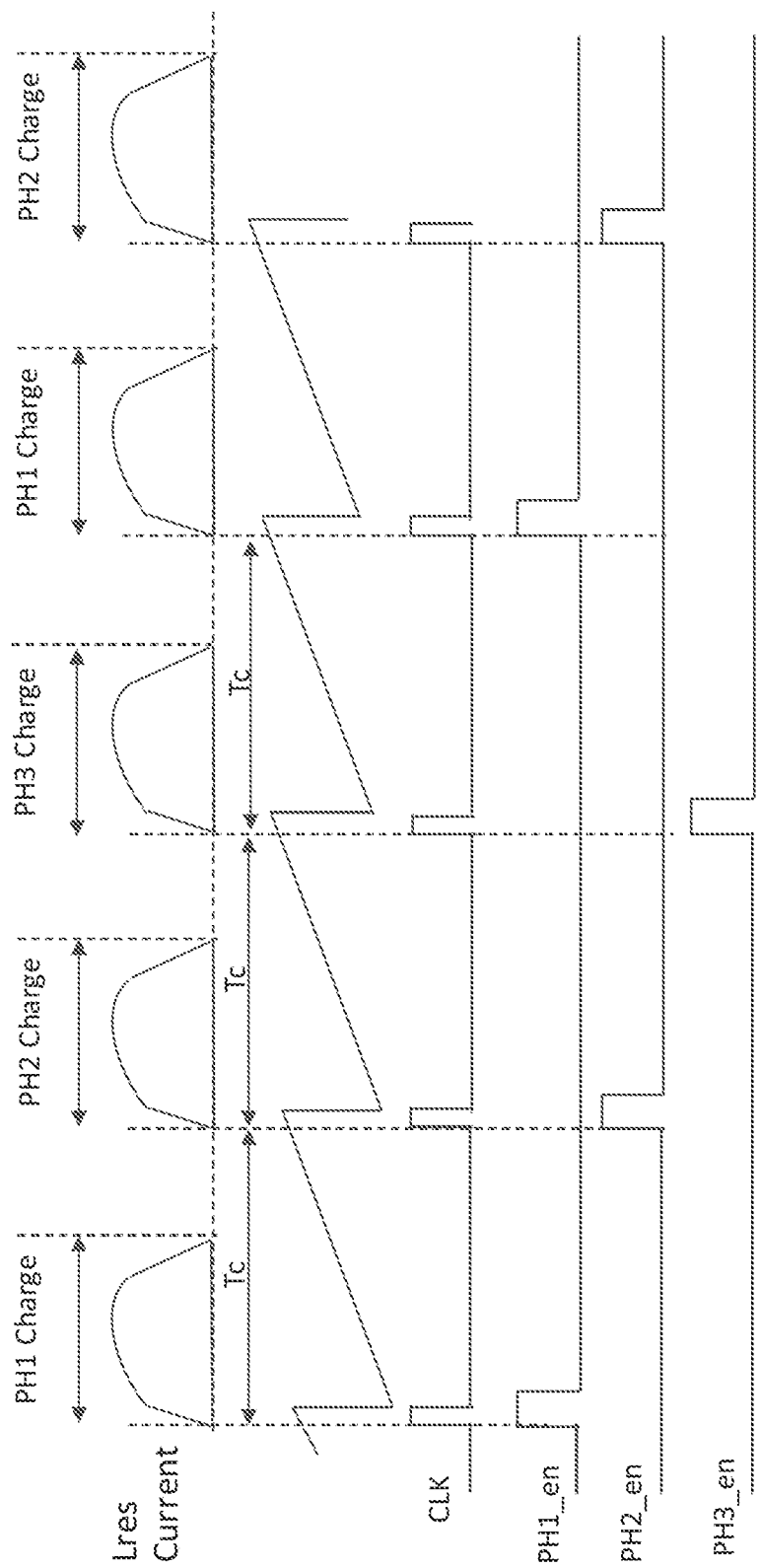
FIG. 4 is a waveform diagram illustrating wave forms for signals of the power delivery control circuit 100 illustrated in FIG. 1.

FIG. 4 is a waveform diagram illustrating wave forms for signals of the power delivery control circuit 100 illustrated in FIG. 3. Now referring to FIG. 5, the waveforms for the power delivery control circuit illustrated in FIG. 3 are illustrated for a light load condition. The first waveform is the inductor current (Lres Current) the second waveform is the voltage, the third waveform is the clock pulse and the fourth, fifth and sixth are the trigger signals for triggering phase 1, phase 2 and phase 3, respectively.

As shown in FIG. 4, for the given load condition, the Voltage to Time Circuit has set the time between the starts of the phase charging times as Tc. The phaser circuit triggers phase 110 to execute one cycle which causes an amount of charge or current or energy to be delivered to the inductor of the illustrated LC filter. After the time Tc has expired, the Voltage to Time Circuit 154 sends a second pulse to the phaser circuit 156. In this case the phaser circuit 156 triggers phase 120 to execute one cycle which causes an amount of charge or current or energy to be delivered to the inductor of the illustrated LC filter. After the time Tc has expired, the Voltage to Time Circuit 154 sends a third pulse to the phaser circuit 156. In this case the phaser circuit 156 triggers phase 130 to execute one cycle which causes an amount of charge or current or energy to be delivered to the inductor of the illustrated LC filter.

In some embodiments, the amount of charge or current or energy delivered to the inductor by each of the phases 110, 120, and 130 may be controlled. For example, the amount of charge or current or energy may be controlled by design of the components of the power delivery control circuit 100, or may be controlled by controlling signals of the power delivery control circuit 100. For example, phaser circuit 156 may be configured to trigger phases 110, 120, and 130 by delivering pulses of variable widths, where the pulse width is controlled by a controller. Alternatively, each of phases 110, 120, and 130 may be configured to deliver a variable amount of charge or current or energy, where the amount is controlled by the controller. Other mechanisms of controlling the charge or current or energy delivered to the inductor by each of the phases 110, 120, 130 may additionally or alternatively be used.

After the time Tc has expired, the Voltage to Time Circuit 154 sends a fourth pulse to the phaser circuit 156. In this case the phaser circuit 156 triggers phase 110 to execute one cycle which essentially sends a controlled amount of energy to the connected inductor and out to the load. After the time Tc has expired, the Voltage to Time Circuit 154 sends a fifth pulse to the phaser circuit 156. In this case the phaser circuit 156 decides to trigger phase 120 to execute one cycle which essentially sends a controlled amount of energy to the connected inductor and out to the load.

In some embodiments the power delivery control circuit 100 and/or phaser circuit 156 may have one or more of the following features:

Charge mode control, where the phaser circuit 156 is configured to arbitrate which phase to fire next. In some embodiments, the charge delivered to the inductor during each cycle is controlled. In some embodiments, the current delivered to the output capacitor and load starts at zero and returns to zero in response to each pulse from the Voltage to Time Circuit 154.

At light loads, the time between a phase being fired again can be large. During an 'off' time between firing of phases, the phase is does not deliver current to the inductor, and as such can be considered 'off' or 'shed'. In other words, phase shedding can be an automatic by product of this control scheme.

This auto phase shedding can also allow for portions of the phase to be turned off while the phase is shed. For example, a bias current to the phase may be turned down or off to reduce power consumption and heat.

In some embodiments some of the features of the power delivery control circuit 100 are:

Time based control loop architecture.

Each time a phase is 'fired' or 'triggered' it delivers a 'quantity of charge' to the output.

The control loop determines 'Tc', the time between successive phase triggering. The smaller the 'Tc', the quicker next phase gets fired. In other words, 'Tc' determines the rate at which 'quantities' of charge get delivered to the output.

A Control Timer circuit can be configured to monitor the output voltage and the commanded/desired voltage (DAC voltage) to calculate the precise 'Tc' required.

The Control Timer circuit can be digital, analog, or a combination thereof.

The power delivery control circuit can utilize digital technology, analog technology or a combination of digital and analog technologies. More specifically, in some embodiments signals such as, but not limited to, the error voltage and the output voltage can be analog signals or digitized signals. The timer can be a digital programmed timer or an analog timer that charges a capacitor. Similarly logic functions can be performed with digital data or analog comparators. Any combination of technologies can be employed and this disclosure is in no way limited to a particular digital or analog technology to perform any particular function.

Figure 5:
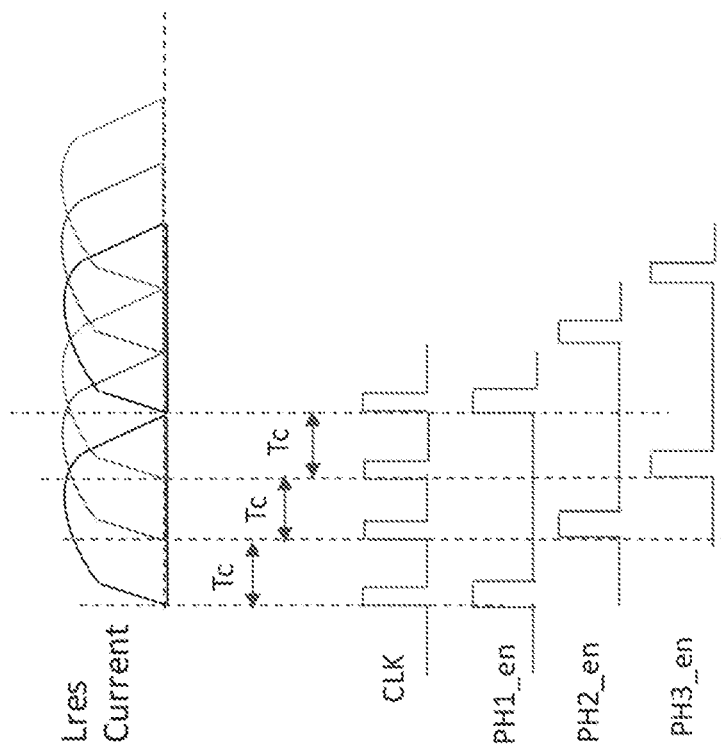
FIG. 5 is a waveform diagram illustrating wave forms for signals of the power delivery control circuit 100 illustrated in FIG. 1.

FIG. 5 is a waveform diagram illustrating wave forms for signals of the power delivery control circuit 100 illustrated in FIG. 3. Now referring to FIG. 5, high load waveforms are illustrated for the power delivery circuit shown in FIG. 3. As shown in FIG. 5, phase 110, phase 120 and phase 130 trigger pulses are much closer together such that a much higher average charge or current or energy is transferred to the load than for the low load case illustrated in FIG. 4. More specifically, the charge or current or energy delivered by each phase overlaps in time with the charge or current or energy delivered by each adjacent phase as shown by the Lres Current waveform.

Figure 6:
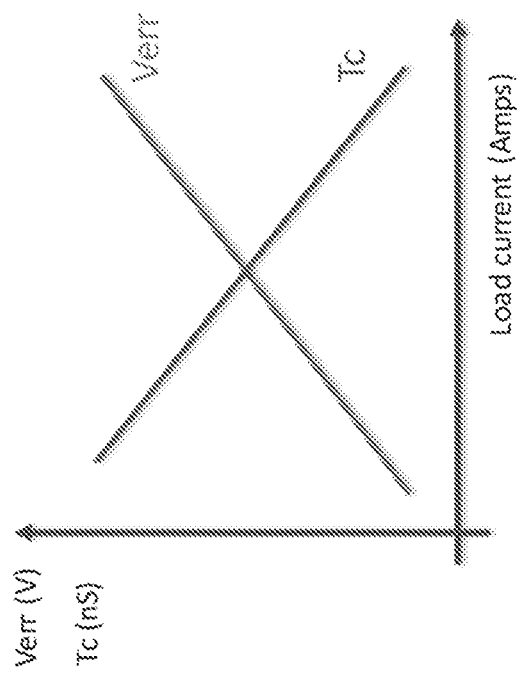
FIG. 6 is a diagram illustrating Tc (time between starts of phase pulses) and Verr (error voltage) dependence on load current.

FIG. 6 is a diagram illustrating an example embodiment of Tc and Verr dependence on load current. In alternative embodiments, the Tc and Verr dependence on load current has characteristics which are not illustrated in FIG. 6. For example, in some embodiments, the Tc and/or Verr dependence on load current is not linear. As shown in FIG. 6, as load current increases, Verr increases, and Tc reduces. In addition, as illustrated in FIG. 5, as load current increases, CLK pulses occur more frequently. At high enough load current conditions the output of the phases overlap to provide an increased output current and can seamlessly transition into continuous conduction mode (CCM) operation for delivering even higher current. In some embodiments a CCM circuit such as those disclosed in U.S. patent application Ser. No. 15/640,335 filed on Jun. 30, 2017 which is incorporated herein by reference in its entirety for all purposes, can be used with the power delivery control circuit 100.

Figure 7A:
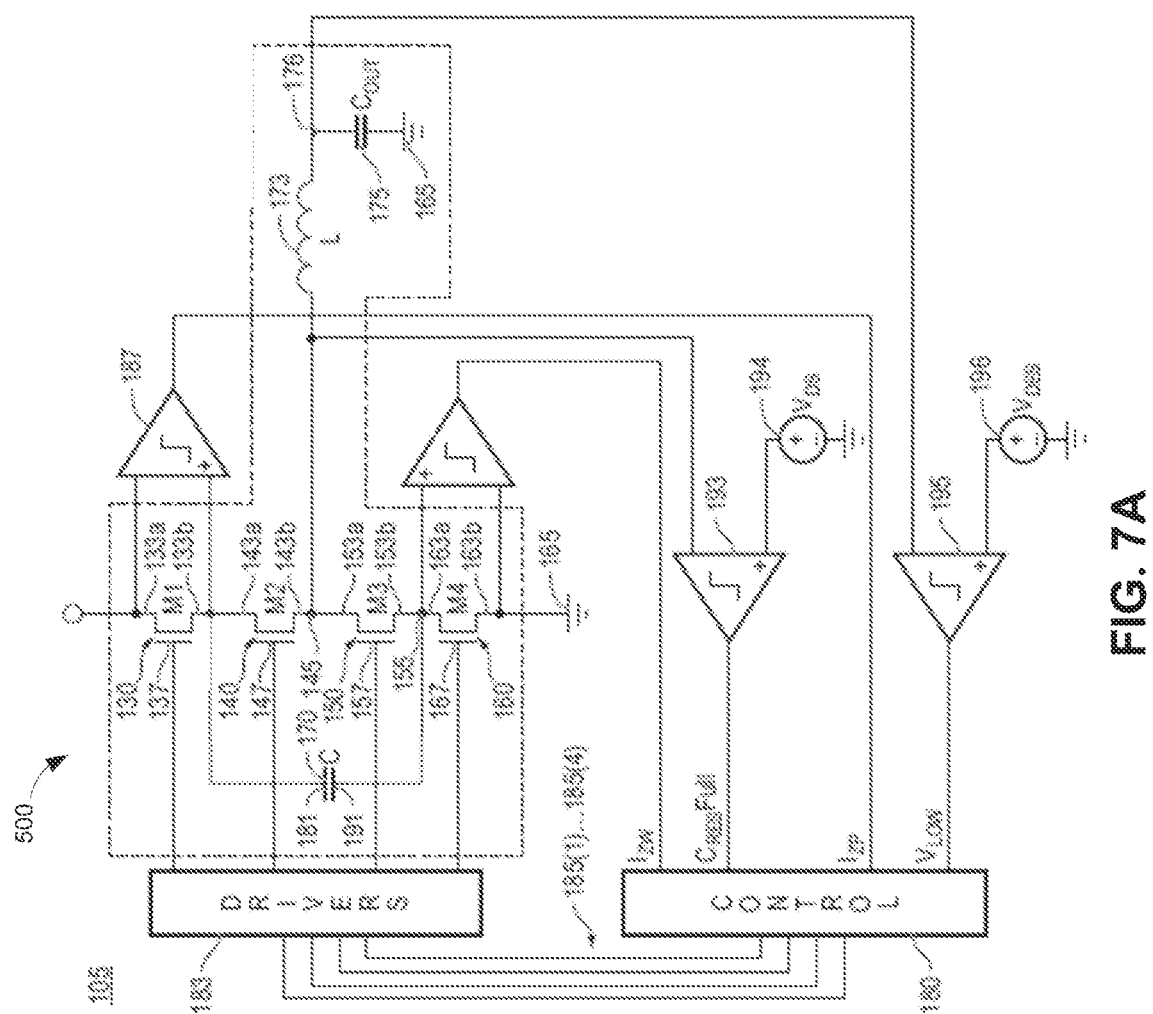
FIG. 7A is a schematic illustration of a power delivery engine.

FIG. 7A is a schematic illustration of a power delivery engine 500. In this embodiment, power delivery engine 500 comprises a power regulator circuit. Now referring to FIG. 7A a non-limiting example schematic of a power delivery engine 500 that can be used for each phase of the power delivery control circuit 100 illustrated in FIG. 3 is shown. In this example the power delivery engine 500 includes a plurality of sequentially coupled power switches M1, M2, M3, and M4.

Figure 7B:
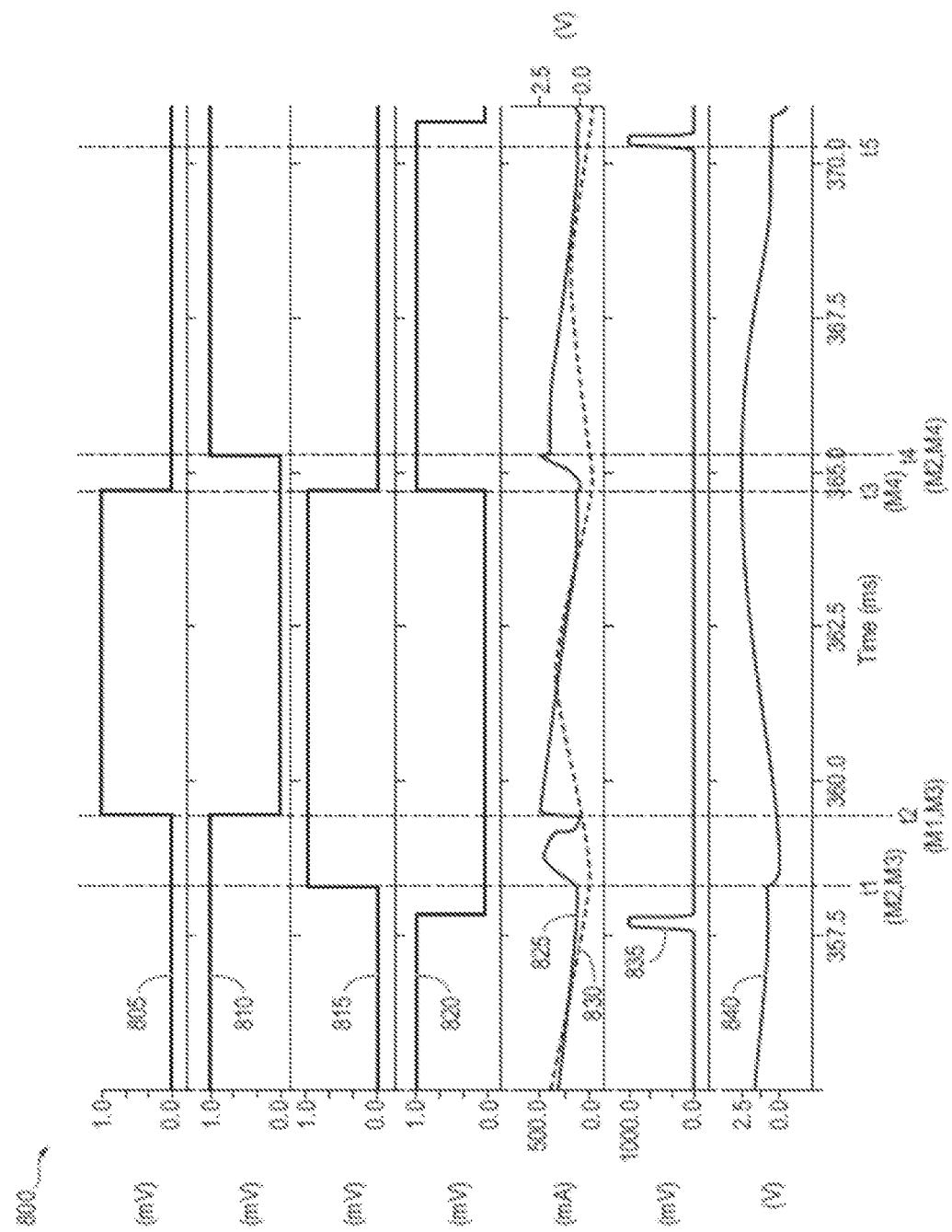
FIG. 7B illustrates one example of the waveforms for the power delivery engine 500 illustrated in FIG. 7A.

FIG. 7B illustrates one example of the waveforms for the power delivery engine 500 illustrated in FIG. 7A. These circuits and others are described in more detail in U.S. Pat. No. 9,300,210 issued on Mar. 29, 2016, which is incorporated by reference herein in its entirety for all purposes.

Trace 805 illustrates a control voltage applied to first solid-state switch 130. In the particular embodiment depicted, switches are turned on when approximately 1 volt is applied.

At time t1 trace 805 is at approximately 0 volts thus first solid-state switch 130 is off. Trace 810 illustrates a control terminal voltage applied to second solid-state switch 140. At time t1 trace 810 is at approximately 1 volt thus second solid-state switch is on. Trace 815 illustrates a control terminal voltage applied to third solid-state switch 150. At time t1 trace 815 transitions to approximately 1 volt thus third solid-state switch 150 transitions from off to on. Trace 820 illustrates a control terminal voltage applied to fourth solid-state switch 160. At time t1 trace 820 is at approximately 0 volts thus fourth solid-state switch is off.

Trace 825 illustrates a voltage at second junction 145. At time t1, capacitor 170 is shorted. Trace 830 illustrates current through inductor 173. At time t1 inductor 173 is decoupled from the remainder of switched regulation circuit 125 thus the current in inductor 173 is zero. Trace 835 illustrates a comparator output corresponding to a zero current condition in inductor 173, as discussed in more detail below. Trace 840 illustrates the voltage across capacitor 170. At time t1 capacitor 170 is shorted causing the voltage across capacitor 173 to decrease as the capacitor is discharged.

Figure 8:
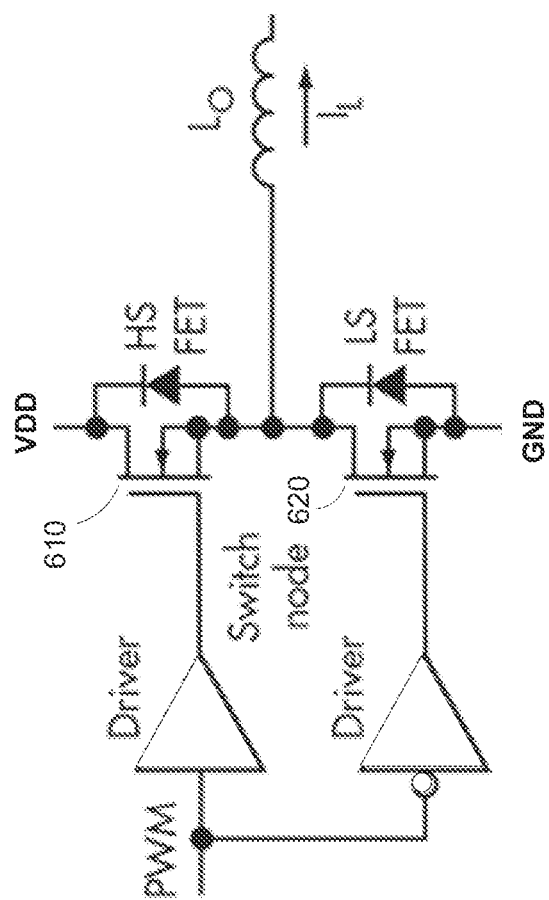
FIG. 8 is a schematic illustration of a power delivery engine.

Now referring to FIG. 8 a non-limiting example schematic of a power delivery engine 600 that can be used in each phase of the circuit 100 illustrated in FIG. 3 is shown. In this example the power delivery engine 600 includes a two coupled power switches 610 and 620 arranged in a synchronous buck converter configuration, as known in the art. Other embodiments can have different power delivery engines including, but not limited to full bridge, buck, boost, buck boost, and other types of power control circuits known by one of skill in the art.

Figure 9:
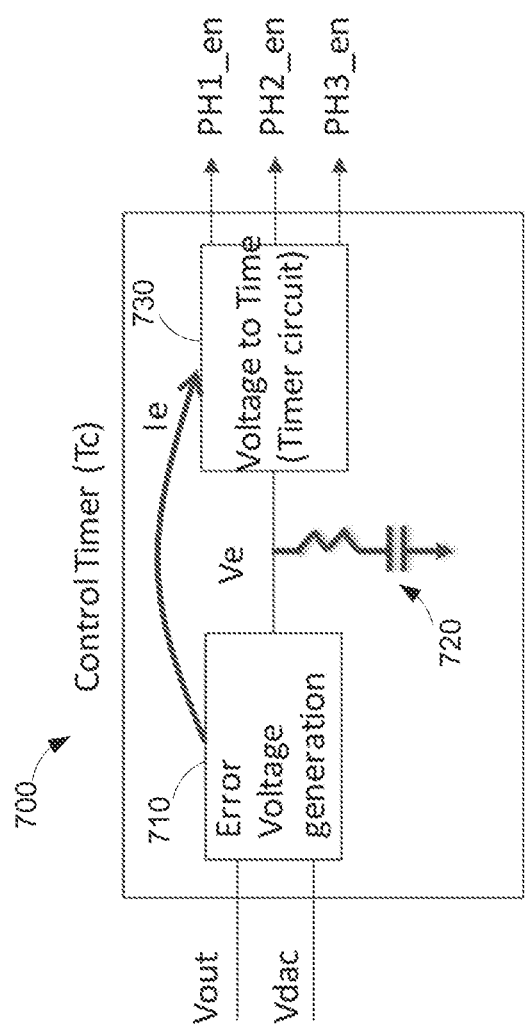
FIG. 9 is a schematic illustration of a control timer circuit.

Now referring to FIG. 9 a transient performance boost circuit 700 is shown that can be used instead of control circuit 150 in the power delivery control circuit 100 illustrated in FIG. 3. In some embodiments the transient performance boost circuit 700 can include one or more of the following features:

For fast transient response, the error voltage generation 710 can incorporate multiple enhancement schemes.

One such scheme temporarily increases the GM of an error amplifier in the Error Voltage generation 710. The increase in GM helps the control voltage "Ve" quickly ramp up or down in response to the error voltage seen at the input (Vout-Vdac).

Another scheme employs a feed forward signal (Ie) supplied from the error amplifier and delivered to the timer such that during a transient an error current bypasses the compensation network 720 and quickly changes the timer circuit 730 output (Increases or decreases the frequency of phase firing).

Another scheme employs a fixed offset in the timer circuit 730. Detecting a transient, the offset can be either increased or decreased instantly such that the frequency change is instant giving a rapid response.

Another scheme employs multiple bands of frequency of operation. Timer circuit 730 is configured to generate a range of output frequencies corresponding with the functional range of control voltage (Ve). In a multiple frequency band scheme, timer circuit 730 is programmable so as to generate a different range of output frequencies for each frequency band. Accordingly, when using a multiple frequency band scheme, the frequency generated by timer circuit 730 is determined based on both the control voltage (Ve) and the programmed frequency band. Control of the output frequency is achieved through a combination of response to error voltage for fine control and frequency band selection for coarse control.

During transient conditions, bands can be hopped (band hopping) up or down to quickly achieve the desired operating frequency. For example, in response to the control voltage (Ve) saturating, by being driven outside its functional range, timer circuit 730 may be programmed by a controller to operate in an appropriate adjacent higher or lower frequency band. Alternatively or additionally, timer circuit 730 may be programmed by a controller to operate in a higher or lower frequency band in response to the control voltage (Ve) increasing or decreasing at a rate greater than a threshold.

In some embodiments bump type sequencing of each phase can be used when a plurality of serially coupled power devices are used, for example, as described in application Ser. No. 15/640,335 filed on Jun. 30, 2017 and U.S. Pat. No. 9,300,210 issued on Mar. 29, 2016, which are incorporated herein in their entirety by reference. The bump type sequencing can include one or more of the following features:

- Each phase can deliver two types of "Bumps" or charge delivery sequences, named VDD bump and GND bump, a VDD bump caused by current sourced from or sunk by the VDD power supply being sunk by or sourced from the connected inductor, and a GND bump caused by current sourced from or sunk by the connected inductor being sunk by or sourced from the GND power supply.
- The phases may collectively deliver these two bumps strictly in alternate sequence. VDD=>GND=>VDD=>GND and so on. For example, this may occur by each of the phases delivering alternating bumps (VDD=>GND=>VDD=>GND and so on.)
- In some embodiments, an alternative bump sequence may be preferred.
- For example, a VDD bump may excite the supply network more than a GND bump. Therefore, the phases in a multiphase system may collectively deliver more GND bumps than VDD bumps.
- In some systems, a frequency of the VDD bumps and/or the GND bumps may be controlled through selection of a VDD/GND bump sequence.
- In some embodiments the phase firings can be sequenced to achieve an arbitrary bump sequence. For instance a 3 phase system can deliver VDD=>VDD=>VDD=>GND=>GND=>GND sequence. Or it can also deliver VDD=>GND=>VDD=>GND=>VDD=>GND sequence. The bump sequence used can affect the frequency at which the input network is excited.
- Depending on the input impedance network, an optimal choice of bump sequence can be programed to achieve the optimal supply noise characteristics.
- The power supply switching frequency can be kept away from the input network resonant frequency (or where the input impedance is large).
- This feature can also help during transient response at least because the current load on the power supplies are distributed in time. As a result, the bypass capacitance and low power bus impedance are sufficient to prevent unacceptable power supply transients. Therefore, the voltage difference between the positive and negative power supplies remains substantially fixed.

In some embodiments, the bump sequence of each of the phases is controlled using methods discussed in described in application Ser. No. 15/640,335 filed on Jun. 30, 2017 and U.S. Pat. No. 9,300,210 issued on Mar. 29, 2016, referenced above. To coordinate a collective bump sequence collectively generated by the multiple phases, a controller receives or determines a target collective bump sequence, and determines a bump sequence for each of the phases. The controller provides signals for each of the individual phases so as to cause each of the individual phases to operate with the bump sequence determined therefor by the controller. Accordingly, each of the individual phases operate with the bump sequence determined therefor, and the collective bump sequence generated by the multiple phases correspondence with the target collective bump sequence.

Figure 10:
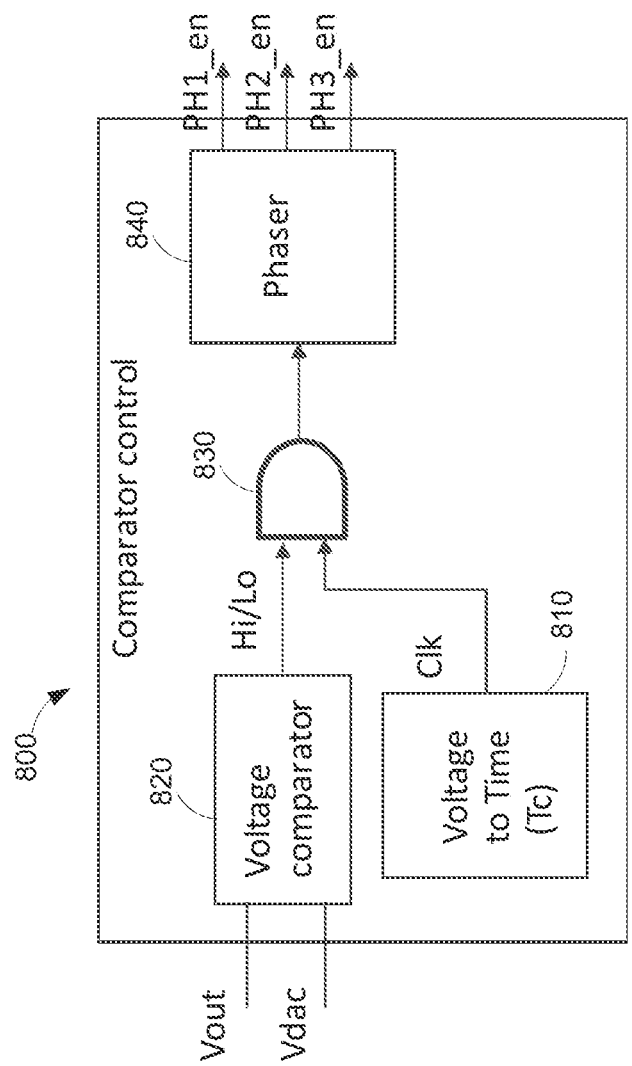
FIG. 10 is a schematic illustration of a comparator mode control circuit.

Now referring to FIG. 10, a comparator mode control circuit 800 can be used instead of control circuit 150 in the power delivery control circuit 100 illustrated in FIG. 3. The comparator mode control circuit 800 can combine the output of the timer 810 with the output of a comparator 820 so the decision to trigger the next phase includes the following conditions: 1) has the timer expired? and 2) is the output voltage below a threshold voltage? Both of these conditions must be true for the next phase to trigger. This feature can be particularly useful for semiconductor processes where a timer with a wide time range is difficult to make so at light loads the comparator can be relied upon such that the next phase will only be triggered if the output voltage goes below a threshold voltage. In some embodiments the comparator mode control can have one or more of the following features:

- Comparator mode control circuit 800 may be used in addition to one or more other control schemes. For example, comparative mode control circuit 800 and control circuit 150 may both be used. Which control circuit is active to be determined, for example, based on load conditions. For example, comparator more control mode control circuit 800 may be used when the load is less than a threshold.
- Band hopping along with a comparator can be used to provide a fast transient response.
- The comparator mode control is also useful during Start up, Dynamic Voltage Scaling (DVS) Up and DVS Down. In comparator mode overshoot and undershoot is minimized based on the state of the comparator output.

In some embodiments, the comparator 820 is hysteretic.

In some embodiments a comparator control circuit can be included as a portion of the phaser circuit. More specifically, a comparator control circuit can use Vout and the clock signal to only allow the phaser to execute a phase if Vout is below a predetermined voltage and a clock signal is received from the Voltage to Time circuit. This feature can protect against the phaser sending trigger signals to one or more phases if Vout is above the predetermined voltage but due to transients or bandwidth limitations of the control circuit one or more clock signals are sent. Because Vout is above the predetermined voltage no phases will be triggered.

In some embodiments any logical combination of Vout and the timer output can be used as an input to the phaser. In various embodiments the comparator control circuit can be implemented via analog circuitry, digital circuitry or a combination thereof In one example, the output voltage can be digitized, the timer can be digital and a digital processor can be used to make a logical decision whether or not to transmit a pulse to the phaser.

Figures 11, 12:
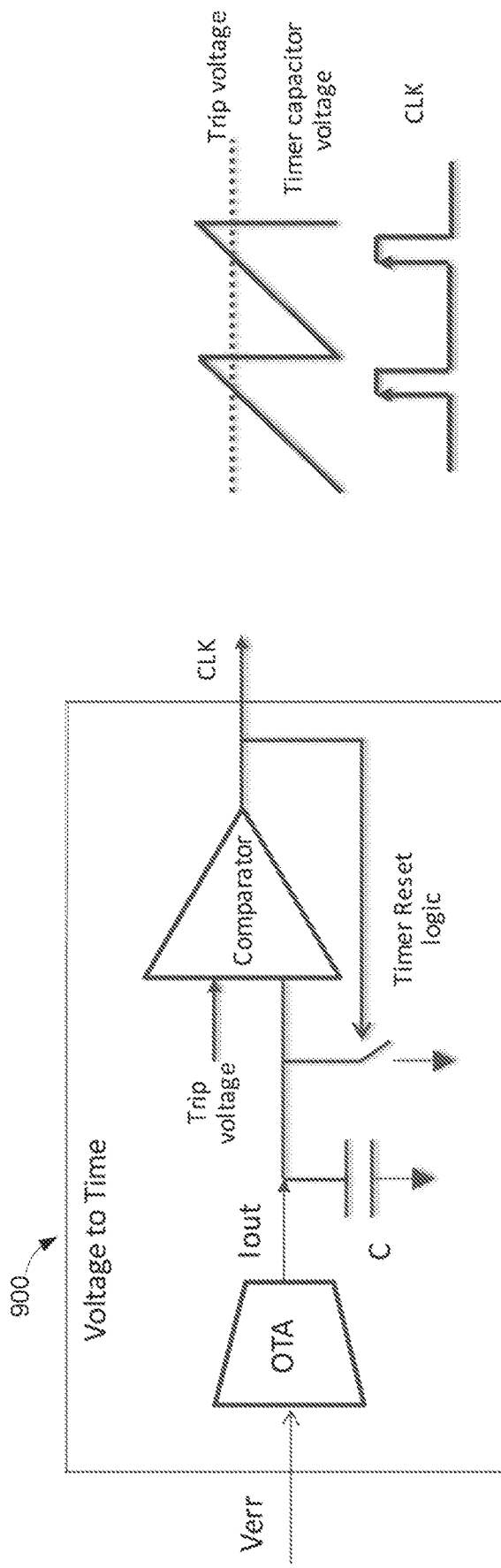
FIGS. 11 and 12 illustrate an embodiment of a voltage to time circuit.

Now referring to FIGS. 11 and 12, an embodiment of a voltage to time circuit 900 is illustrated. Voltage to time circuit 900 can be used with the power delivery control circuit shown in FIG. 3. In some embodiments the voltage to time circuit 900 can have one or more of the following features:

The trip voltage can be dynamically changed to get faster response during a transient. For example, during a loading transient trip voltage can be decrease.

For DVS up transition, trip voltage can be decreased while for a DVS down transition, trip voltage can be increased.

Figures 13, 14:
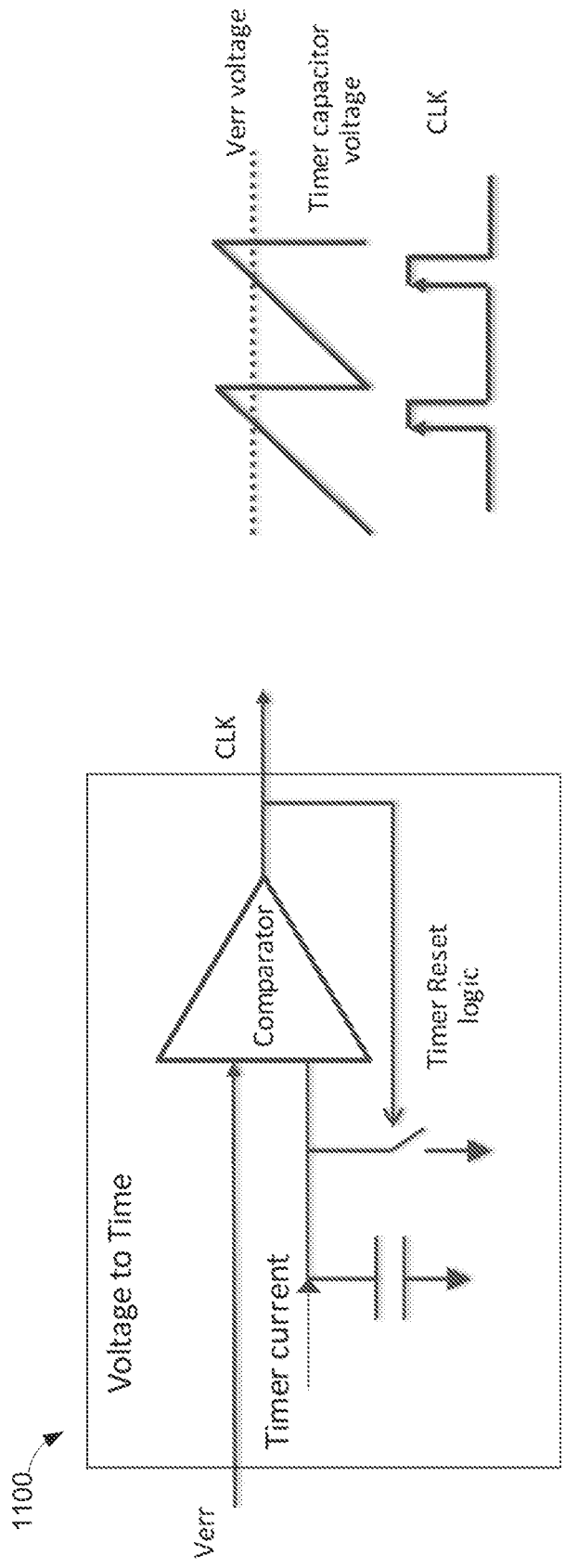
FIGS. 13 and 14 illustrate an embodiment of a voltage to time circuit.

The capacitance of capacitor C can be changed to increase or decrease the clock output frequency FIGS. 13 and 14 illustrate an embodiment of a voltage to time circuit. Now referring to FIGS. 13 and 14, an embodiment of a voltage to time circuit 1100 is illustrated. Voltage to time circuit 1100 can be used with the power delivery circuit shown in FIG. 3. In some embodiments the voltage to time circuit can have one or more of the following features:

Timer current can be programmable to give control on the clock frequency range.

Timer current can be dynamically changed to improve transient response, for example, during loading transient, the timer current can be increased to generate faster clock frequency.

During DVS up, timer current can be increased.

The capacitance of capacitor C can be changed to increase or decrease the clock output frequency.

Figure 16:
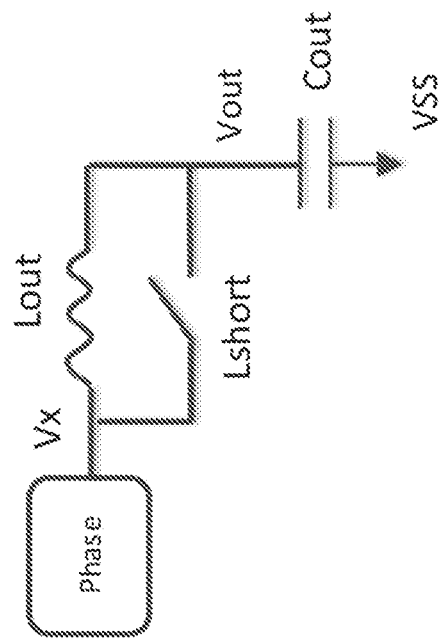
FIGS. 15 and 16 illustrate an embodiment of inductor shorting.
Figure 15:
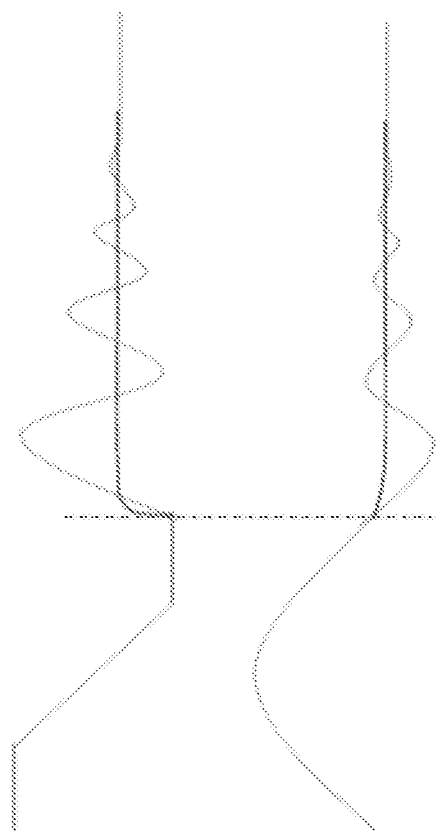

FIGS. 15 and 16 illustrate an embodiment of inductor shorting circuit Lshort. In this embodiment inductor shorting circuit Lshort is a switch. Now referring to FIGS. 15 and 16, in some embodiments inductor shorting can be used to improve linearity of the power delivery circuit shown in FIG. 3. Inductor shorting can include one or more of the following features:

During discontinuous current mode (DCM) operation, the phase circuit of FIG. 15 presents a high impedance to the switching node Vx. As a result, the voltage at switching node Vx and the current through the inductor ring based on the capacitances, resistances, and inductances of the circuit according to principles understood by those of skill in the art. The ringing may not be desired in some embodiments since it leaves the starting current in the inductor at the beginning of the next cycle, when switching node Vx is again driven by the phase, in an uncontrolled state. The uncontrolled state is at least partially influenced by previous data, such that the uncontrolled state causes non-linearity.

An inductor shorting circuit Lshort can be used such that while the inductor is not driven by the phase, the switching node Vx and the output Vout are shorted.

The shorting causes the inductor current to be equal or substantially equal to zero. This allows for the next cycle of that phase, when switching node Vx is again driven by the phase, to begin with a controlled and/or consistent zero or substantially zero or near zero current instead of starting in the uncontrolled state, which may be either a positive or a negative current.

To short the inductor, inductor shorting circuit Lshort becomes conductive while the phase connected thereto is in a high impedance state (for example, as is common to multiple parallel coupled FETS and Buck architectures). Inductor shorting circuit Lshort may remain on for a small predetermined amount of time or may stay on until just before the phase is fired again.

The inductor shorting circuit Lshort shorts the output inductor and provides a low impedance path for charging the parasitic capacitance at switching node Vx to the voltage at node Vout.

Because Lout and Cout form an LC oscillator, without the inductor shorting circuit Lshort, the parasitic node may ring undesirably.

In another embodiment, the inductor shorting circuit Lshort can electrically short the switching node Vx to another voltage source (Supply for example) for a brief amount of time to charge the switching node Vx to the supply voltage, after which the inductor shorting circuit Lshort may be opened. By charging the switching Vx node to the supply voltage, the ringing may be greatly reduced and/or may be controlled such that the next cycle of the phase, when switching node Vx is again driven by the phase, begins with a consistent current instead of starting in the uncontrolled state.

Figure 17:
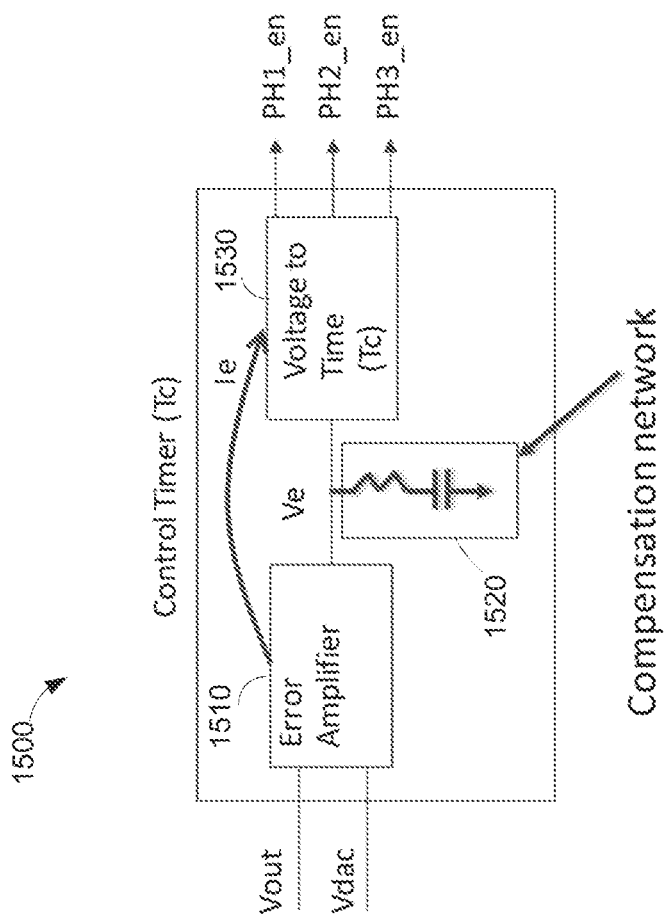
FIG. 17 is a schematic illustration of a control timer circuit.
Figure 18:
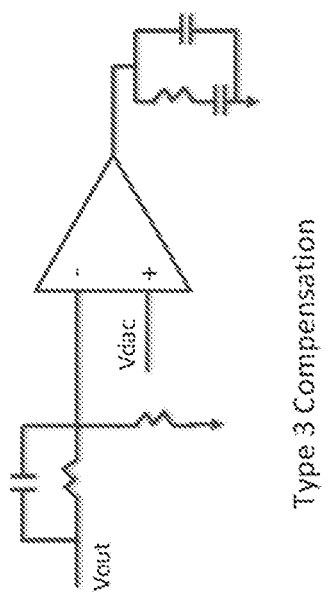
FIGS. 18-20 are schematic illustrations of compensation networks according to some embodiments.
Figure 19:
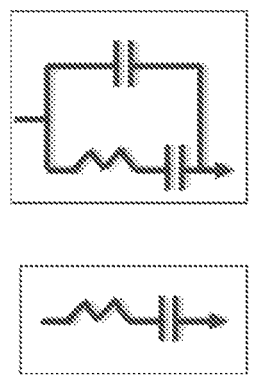
Figure 20:
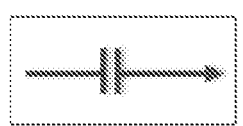

Now referring to FIG. 9 a transient performance boost circuit 700 is shown that can be used instead of control circuit 150 in the power delivery control circuit 100 illustrated in FIG. 1. In some embodiments the transient performance boost circuit 700 can include one or more of the following features:

FIG. 17 is a schematic illustration of a control timer circuit 1500. Now referring to FIG. 17, a control timer 1500 is shown that can be used instead of control circuit 150 in the power delivery control circuit 100 illustrated in FIG. 3. In this embodiment, a compensation network 1520 is coupled between the Error Amplifier 1510 and the Voltage to Time circuit 1530. In various embodiments the compensation network 1520 is used to improve the stability of the Verr signal to make the feedback loop more stable and reliable. In one example embodiment the compensation network 1520 can include a capacitor to ground as shown. In further embodiments, illustrated in FIGS. 18, 19 and 20, the compensation network can include a Type 3, a Type 2 or a Type 1 compensation circuit, respectively, as known by those of skill in the art. Other compensation networks can also be used and this disclosure is in no way limited to the disclosed example compensation networks. For example, as illustrated in FIG. 17, another scheme employs a feed forward signal (Ie) from the error amplifier 1510 to the timer 1530 such that during a transient an error current bypasses the compensation network and quickly changes the timer output (e.g., increases or decreases the frequency of phase firing).

In some embodiments one or more telemetry features can be implemented for the power delivery control circuitry 100 illustrated in FIG. 3. For example, in one embodiment telemetry circuitry can be configured to record digital or analog data from the power delivery and control circuitry that corresponds to the current output, voltage output or other characteristic of the power delivery and control circuitry. In some embodiments the power delivery and control circuitry 100 can be used in conjunction with an integrated circuit that includes a processor wherein the processor can be commanded to record the telemetry data and store the telemetry data in an associated memory. In various embodiments the telemetry data can be recorded only when commanded, or in other embodiments it can be recorded continually, for example when used in conjunction with a FIFO memory.

In some embodiments the telemetry circuitry can acquire data associated with the current output of the power delivery and control circuitry 100 by recording data representing the Verr signal generated by the Error Amplifier 152 since the Verr signal can be correlated to the output current. In other embodiments the telemetry circuitry can acquire data corresponding to the frequency of the clock pulses sent by the Voltage to Time (Tc) circuit 154 which can also be correlated with the output current. The accuracy of the telemetry data and how precisely it is correlated to the actual current delivered by the power delivery and control circuitry can be affected by how well controlled and/or known the characteristics of the components of the power delivery and control circuitry are. For example, the specific values of the capacitors, inductors and resistors can affect the accuracy of the data, therefore to improve the accuracy the tolerance on such components can be either highly controlled and/or the components can be characterized and the system can be trimmed to compensate for the characteristics, thereby improving the accuracy.

For simplicity, various peripheral electrical components are not shown in the figures.

Regulator With Continuous Current

In some embodiments power delivery control circuit 100 (see FIG. 3) can be configured to provide continuous current and/or an increase in current to the load by continuously maintaining the current in the inductor of at least one of the phases 110, 120, 130 above zero, as described in more detail below.

Figure 21:
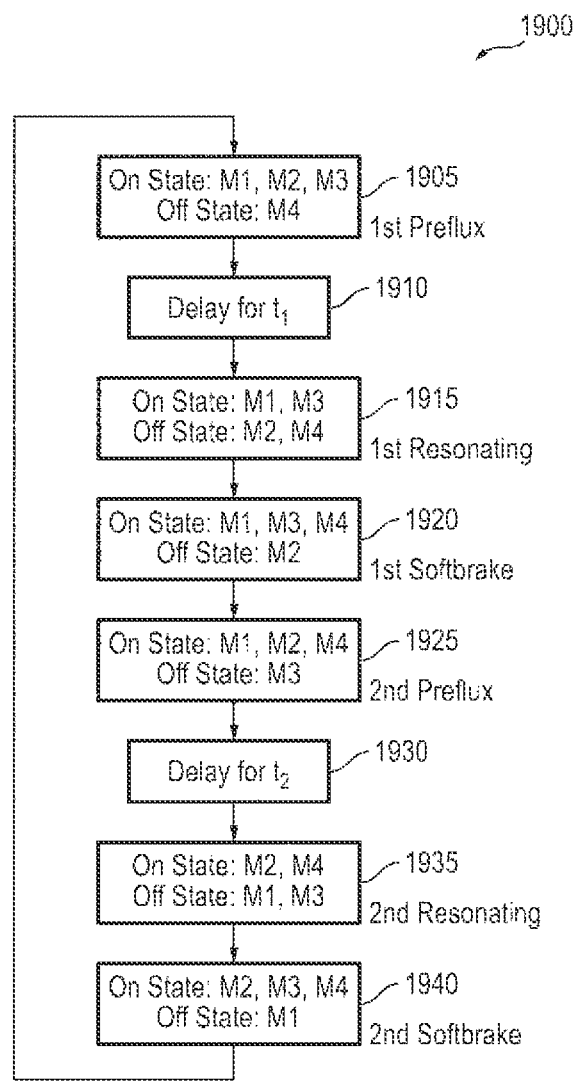
FIG. 21 is a flowchart of a repetitive switching sequence providing a continuous current output for the switched regulation circuit in FIG. 5 according to an embodiment of the invention.
Figure 22:
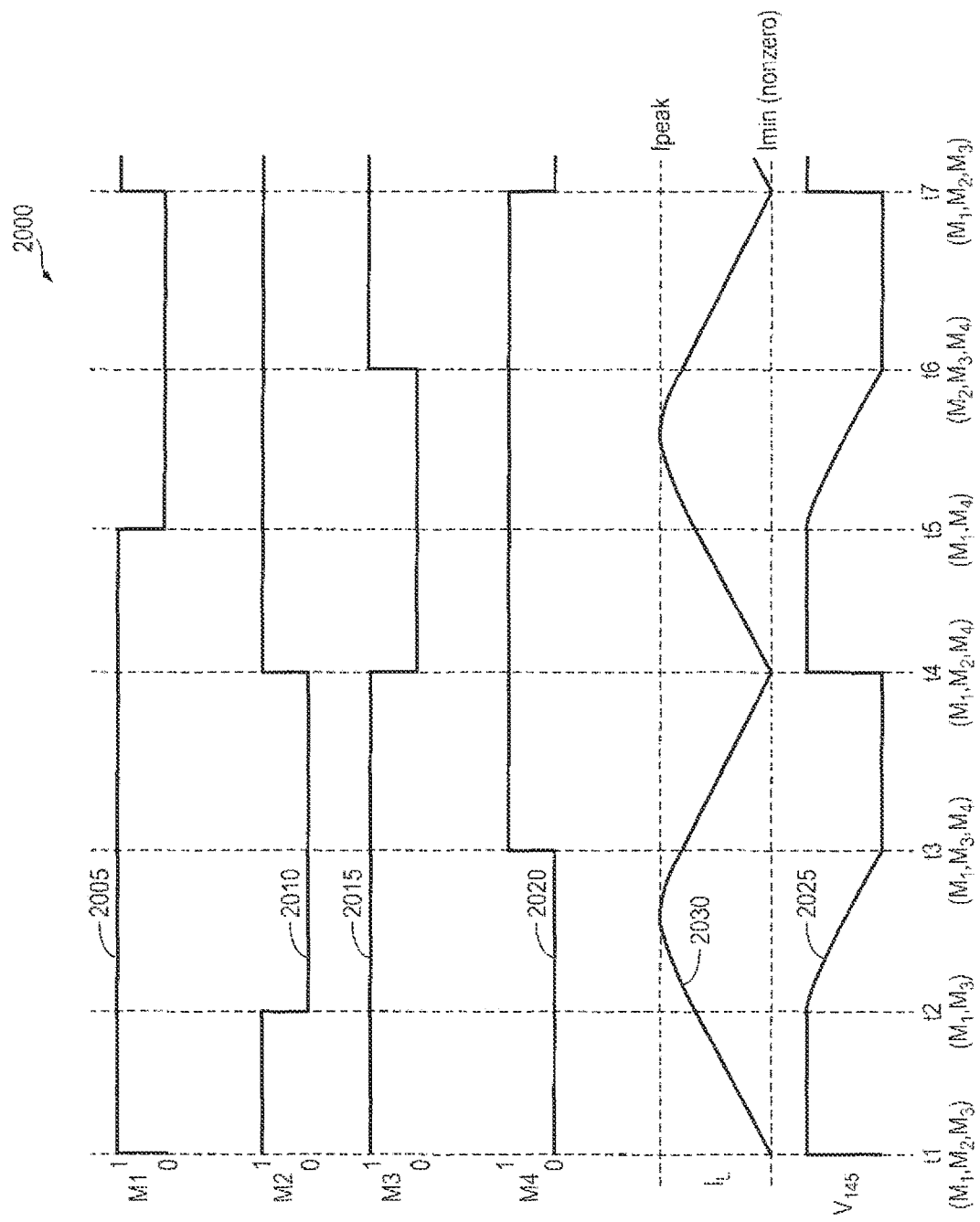
FIG. 22 is a timing diagram of voltages and currents within the switched regulation circuit of FIG. 7A according to the switching sequence in FIG. 21.

Now referring simultaneously to FIGS. 7A, and 19-26 an example switching sequence and timing diagram for an embodiment of switched regulation circuit 125 (see FIG. 7A) with continuous and/or increased current is illustrated. More specifically, FIG. 7A illustrates a simplified schematic of switched regulation circuit 125; FIG. 21 illustrates an example switching sequence 1900 having sequential steps 1905 through 1940 for the four switches in switched regulation circuit 125; FIG. 22 illustrates an example timing diagram showing the control signals delivered to each of the four solid-state switches as well as the current within inductor 173 (IL), and the voltage at second junction 145 (V145) during switching sequence 1900; and FIGS. 23-28 illustrate simplified circuit schematics of each of the six different solid-state switch configurations described in switching sequence 1900. In FIGS. 23-28 solid-state switches that are in an on state are depicted with solid lines and solid-state switches that are in an off state are depicted with dashed lines. The switching sequence illustrated in FIGS. 21 is for example only and other switching sequences, timings and configurations are within the scope of this disclosure.

Figure 23:
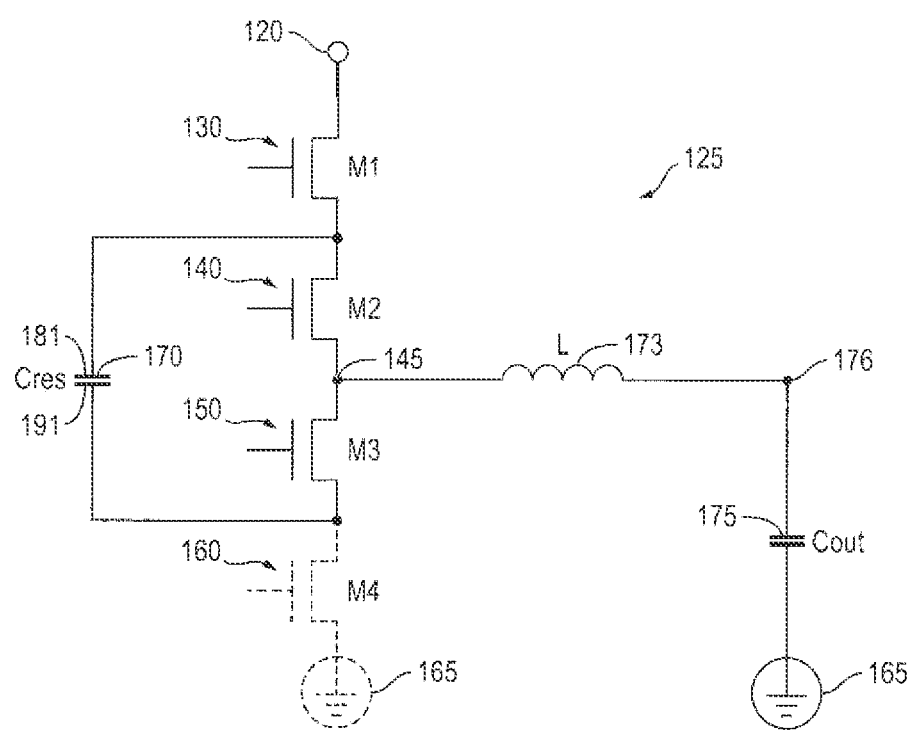
FIG. 23 is a schematic of the switched regulation circuit shown in FIG. 7A in a particular switch configuration according to the switching sequence in FIG. 21.

Now referring to FIG. 21, switching sequence 1900 having sequential steps 1905 through 1940 is illustrated. In step 1905, first, second and third solid-state switches M1, M2 and M3, respectively, are controlled to be in an on state and fourth solid-state switch M4 is controlled to be in an off state. A simplified schematic of switched regulation circuit 125 in step 1905 is illustrated in FIG. 23. Step 1905 is a first inductor prefluxing state where current in inductor 173 (see FIG. 7A) is increased at a substantially linear rate by the application of the input voltage at first terminal 120 (Vin) across the inductor, at a time before capacitor 170 is charged.

Example currents and voltages within switched regulation circuit 125 for step 1905 are illustrated in timing diagram 2000 (see FIG. 22). The logic levels for solid-state switch control signals M1, M2, M3, M4 are indicated by traces 2005, 2010, 2015 and 2020, respectively. A high logic level (sometimes noted as 1) indicates the switch (or composite switch) is in an on state, and a low logic level (sometimes noted as 0) indicates the switch is in an off state.

Timing diagram 2000 illustrates that first step 1905 occurs at time t1. At time t1, trace 2005 shows that a high logic level control signal is applied to first solid-state switch 130, placing it in an on state. Trace 2010 illustrates that at time t1 a high logic level control signal is applied to second solid-state switch 140, placing it in an on state. Trace 2015 illustrates that at time t1 a high logic level control signal is applied to third solid-state switch 150, placing it in an on state. Trace 2020 illustrates that at time t1 a low logic level control signal is applied fourth solid-state switch 160, placing it in an off state.

Continuing to refer to timing diagram 2000, at t1 a voltage at second junction 145 (see FIG. 7A) is illustrated by trace 2025 and is substantially equivalent to the Vin voltage (minus a relatively small voltage drop across M1 and M2) at first node 120. Current in inductor 170 (IL trace 2030) increases rapidly, corresponding to the applied voltage and the characteristics of inductor 173. For some embodiments, the voltage at node 176 (see FIG. 7A) may change a relatively small amount compared with the voltage across the inductor and thus the current may increase substantially linear at a rate approximated by (Vin−Vout)/L where Vout is the voltage at node 176. The current in inductor 173 continues to increase while in this switch state, the duration of which may be controlled by a timer, shown in step 1910 as a delay.

In some embodiments the timer in step 1910 can be fixed while in other embodiments it can be a variable timer. In one example the variable timer can use a lookup table to adjust according to different load conditions and demands on switched regulation circuit 125. More specifically, in some embodiments the timer can be set proportional to a "duty factor" (e.g., Vout/Vin) such that a longer amount of time is selected when a higher Vout is required. In further embodiments the timer in step 1910 can be controlled by a feedback loop based on one or more characteristics of switched regulation circuit 125. In some embodiments the timer may be adjusted by the feedback loop to energize inductor 173 with an appropriate amount of current so that the inductor current resonates to a predetermined current when the first resonating state is engaged (discussed in the next step 1915). In further embodiments the timer can use a comparator that compares the current in the inductor to a programmable current threshold.

In other embodiments, the timer can be made utilizing a current on a capacitor wherein the current starts charging at the beginning of the preflux cycle and may be compared to a predetermined voltage. When the voltage on the capacitor reaches a specified voltage the timer indicates that the preflux cycle should end. In other embodiments the timer function can be performed utilizing logic gates.

In some embodiments, instead of a timer for setting the amount of preflux, the current in the inductor can be monitored during preflux (e.g., step 1905) and the preflux cycle can be set to end when the current reaches a specified level. That specified current level can be adjusted on a cycle by cycle basis to optimize performance. Other timer techniques and timer architectures can be used and are within the scope of this disclosure.

Figure 24:
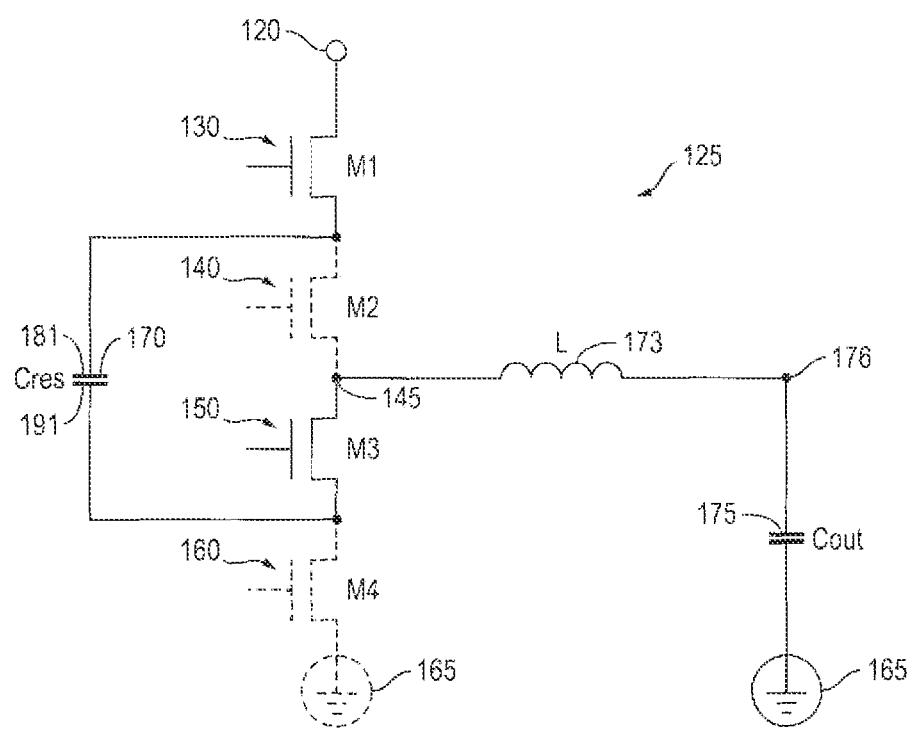
FIG. 24 is a schematic of the switched regulation circuit shown in FIG. 7A in a particular switch configuration according to the switching sequence in FIG. 21.

Now referring to FIG. 21, after the delay in step 1910, the controller advances to step 1915 where first and third solid-state switches M1 and M3 remain on while the second solid-state switch M2 is turned off and the fourth solid-state switch M4 remains off. Thus, first and third solid-state switches, M1, M3, respectively, are on while second and fourth solid-state switches M2, M4, respectively, are off. A simplified schematic of switched regulation circuit 125 in step 1915 is illustrated in FIG. 24. This state couples capacitor 170 in series with inductor 173 and the voltage at first terminal 120 (Vin) is applied directly to second junction 145. Capacitor 170 now begins to charge. Capacitor 170 charges with a time constant set by capacitor 170 and inductor 173 values. Further, as capacitor 170 begins to charge, current flow in inductor 173 continues to increase as the voltage between second junction 145 and the output is positive. Because of the prefluxing operation in step 1905, the current that was already flowing in inductor 173 continues to increase, as discussed in more detail below.

Step 1915 is illustrated in timing diagram 2000 (see FIG. 22) at time t2. Now referring simultaneously to FIGS. 7A and 20, at time t2, second solid-state switch 140 (i.e., trace 2010) turns off. The voltage at second junction 145 (i.e., trace 2025) begins to decrease. Current in inductor 173 (trace 2030) continues to build as capacitor 170 charges. Voltage in capacitor 170 increases towards Vin. As capacitor 170 becomes charged the current in inductor 173 (trace 2030) peaks, then begins to decrease when the voltage at node 145 equals the voltage at node 176 and continues to decrease towards time t3. Thus, in step 1915, capacitor 170 charges, causing a current to flow in inductor 173, and increasing the voltage at output node 176 (Vout). When capacitor 170 is fully charged to the voltage at (Vin) 120, the controller proceeds to step 1920 (see FIG. 21) which is a first "soft braking" configuration that can be used to transition the current remaining in inductor 173. Soft braking can enable a higher current per phase and/or a smaller capacitor 170 per phase as compared to the methodologies discussed above and as explained in more detail below.

Figure 25:
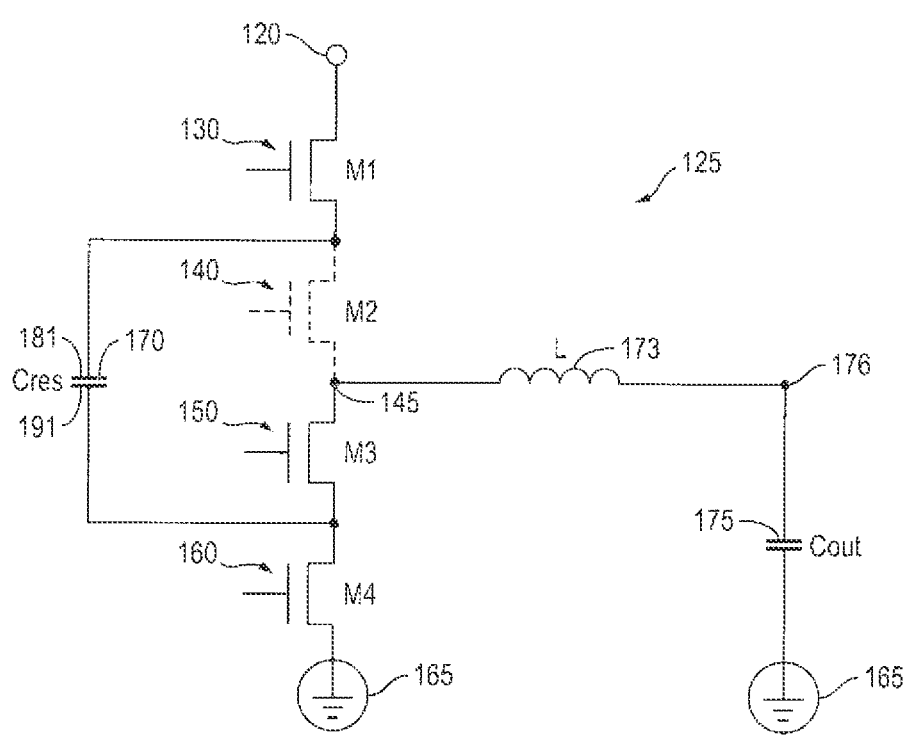
FIG. 25 is a schematic of the switched regulation circuit shown in FIG. 7A in a particular switch configuration according to the switching sequence in FIG. 21.

In the first soft braking configuration (step 1920) first, third and fourth solid-state switches M1, M3 and M4, respectively, are on while second solid-state switch M2 is turned off. A simplified schematic of switched regulation circuit 125 in step 1920 is illustrated in FIG. 25. In this state inductor 173 is coupled to Vin (node 120) through capacitor 170 and also to ground 165 through third and fourth solid-state switches, M3 and M4, respectively, allowing the residual current in the inductor to continue to decrease down to a non-zero minimum current (Imin).

Step 1920 is illustrated in timing diagram 2000 (see FIG. 22) at time t3. Now referring simultaneously to FIGS. 7A and 20, at time t3, fourth solid-state switch 160 (i.e., trace 2020) turns on adding a path between inductor 173 and ground 165. The voltage at second junction 145 (i.e., trace 2025) remains at the ground potential and current in inductor 173 (trace 2030) continues to decrease as the inductor dissipates its stored energy. Current in inductor 173 continues to decrease to a predetermined minimum current (Imin) that is non-zero in this particular embodiment. In some embodiments the minimum current (Imin) can be between 10 milliamps and 50 amperes, while in other embodiments it can be between 100 milliamps and 1 ampere and in another embodiment it can be between 200 milliamps and 400 milliamps. The controller then proceeds to step 1925 (see FIG. 21) that is a second prefluxing state that can be used to increase current flowing through inductor 173.

Figure 26:
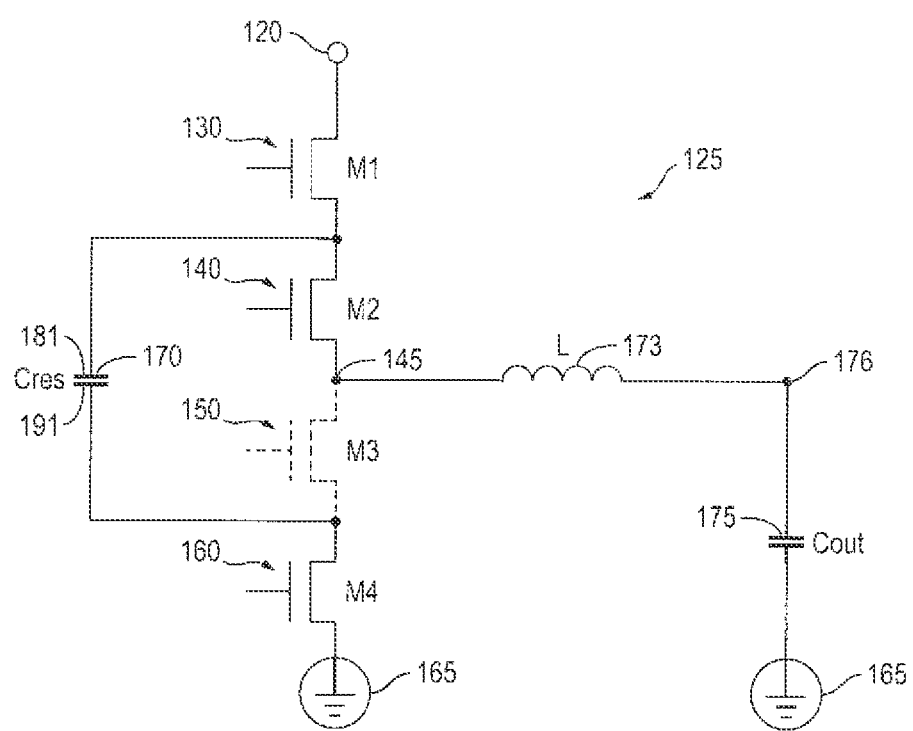
FIG. 26 is a schematic of the switched regulation circuit shown in FIG. 7A in a particular switch configuration according to the switching sequence in FIG. 21.

Now referring to FIG. 21, in step 1925 first fourth solid-state switches, M1 and M4 remain on, second solid-state switch M2 turns on, and third solid-state switches M3 remains off. A simplified schematic of switched regulation circuit 125 in step 1925 is illustrated in FIG. 26.

This is the second inductor prefluxing stage where current in inductor 173 is increased at a substantially linear rate by applying voltage at first output terminal 120 (Vin) to the inductor. In this state the voltage at first terminal 120 (Vin) is applied directly across inductor 173.

Now referring to timing diagram 2000, the second prefluxing state (step 1925) is shown at t4. The voltage at second junction 145 rapidly increases to the Vin voltage at first node 120 shown by trace 2025. Current in inductor 170 (trace 2030) increases rapidly, corresponding to the applied voltage and the characteristics of inductor 173. In some embodiments the rate of current increase can be substantially similar to the rate of current increase in the time between t1 and t2. The current in inductor 173 continues to increase until the switch state is changed, which in one embodiment, may be controlled by a delay shown in step 1930 that can be controlled by a timer, as discussed above.

Figure 27:
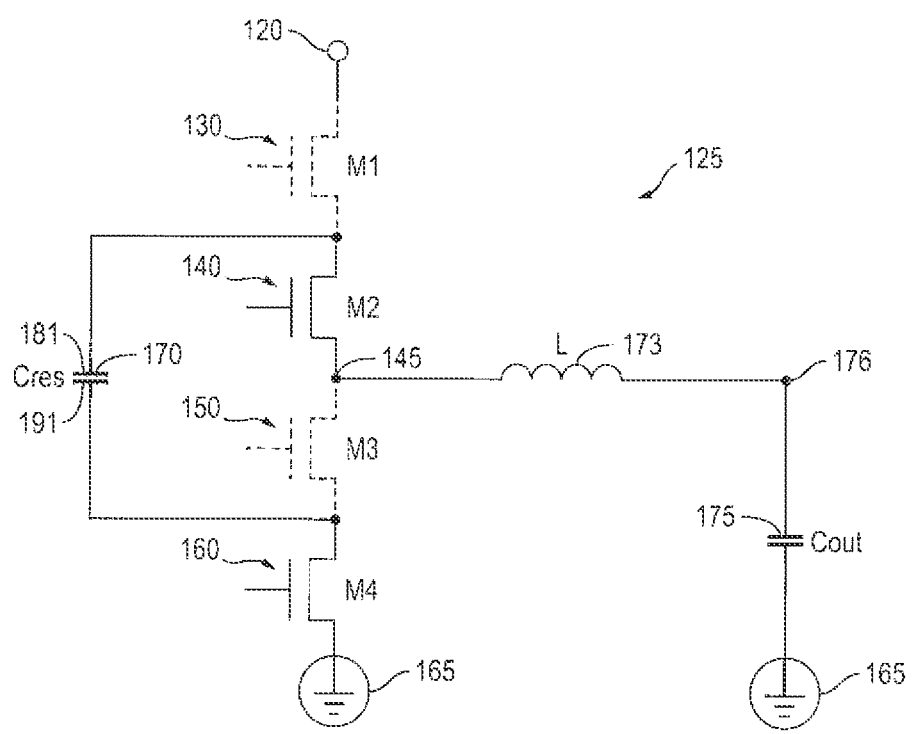
FIG. 27 is a schematic of the switched regulation circuit shown in FIG. 7A in a particular switch configuration according to the switching sequence in FIG. 21.

Now referring to FIG. 21, in step 1935 fourth solid-state switch M4 remains on and second solid-state switch M2 is turned on while first and third solid-state switches M1, M3, respectively, remain off. A simplified schematic of switched regulation circuit 125 in step 1935 is illustrated in FIG. 27. Capacitor 170 is connected between inductor 173 and ground 165, allowing the charge stored in the capacitor to discharge through the inductor to load 115 (see FIG. 1). As capacitor 170 begins to discharge (with a time constant set by capacitor 170 and inductor 173), current in inductor 173 increases. This condition is illustrated in timing diagram 2000 in FIG. 22 at time t5 showing the voltage at second junction 145 (i.e., trace 2025) at a voltage that is close to the voltage at Vin (120) as it is connected to fully charged capacitor 170. As capacitor 170 resonates with inductor 173, it discharges causing current to increase in inductor 173 (i.e., trace 2030). The increase in current causes the voltage at Vout (node 176) to increase. As the charge stored in capacitor 170 is reduced, current in inductor 173 peaks (Ipeak), then begins to decrease (trace 2030).

The controller then proceeds to step 1940 (see FIG. 21) which is a second "soft braking" configuration that can be used to transition the remaining current in inductor 173. Soft braking can enable a higher current per phase and/or a smaller capacitor 170 per phase as discussed above.

Figure 28:
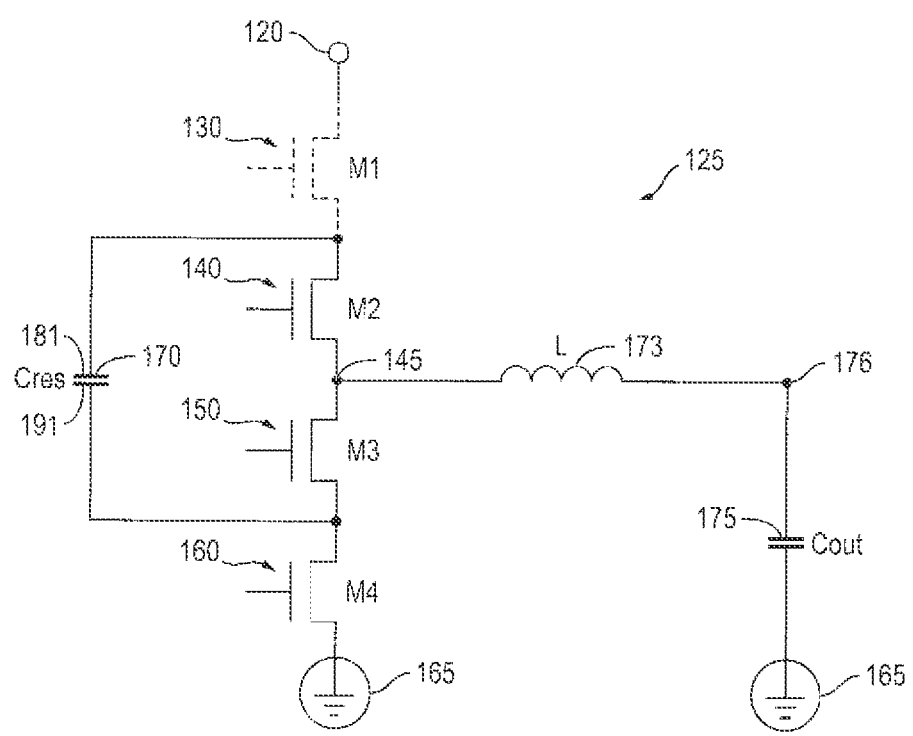
FIG. 28 is a schematic of the switched regulation circuit shown in FIG. 7A in a particular switch configuration according to the switching sequence in FIG. 21.

More specifically, in step 1940 second, third and fourth solid-state switches M2, M3 and M4, respectively, are on while first solid-state switch M1 is turned off. A simplified schematic of switched regulation circuit 125 in step 1935 is illustrated in FIG. 28. In this state inductor 173 is coupled to ground 165 through third and fourth solid-state switches, M3 and M4, respectively, allowing the residual current in the inductor to continue to decrease down to a non-zero minimum current (Imin).

Step 1940 is illustrated in timing diagram 2000 (see FIG. 22) at time t6. Now referring simultaneously to FIGS. 7A and 20, at time t6, third solid-state switch 150 (i.e., trace 2015) turns on adding a path between inductor 173 and ground 165. The voltage at second junction 145 (i.e., trace 2025) remains at the ground potential and current in inductor 173 (trace 2030) continues to decrease as the inductor dissipates its stored energy. Current in inductor 173 continues to decrease to a predetermined minimum current (Imin) that is non-zero in this particular embodiment. The controller then returns to step 1905 (see FIG. 21) which is the first prefluxing state that can be used to increase current flowing through inductor 173.

Timing diagram 2000 in FIG. 22 is for illustration only and is one example of the function of circuit 125 (see FIG. 7A) operating with a non-zero inductor current. Other switching algorithms, control functions and features can be implemented without departing from this disclosure. To control the duration of any of steps 1905-1940 illustrated in FIG. 21 any type of timer or control circuit can be used, including those disclosed herein. For example, in some embodiments a comparator can be used to compare output voltage (Vout) to a commanded voltage. If the output voltage is too low the controller can shorten the soft brake duration and start the next preflux step early, leading to a higher output voltage and higher average output current delivered to load (see FIG. 7A). This control algorithm can also provide a relatively fast response time to loads having high transient voltage requirements. In further embodiments a multi-phase architecture can be employed where multiple switched regulation circuits 125 (see FIG. 2) are used together to provide power to load 115.

In further embodiments alternative switching sequences 1900 can be used to provide additional features and functions of switched regulation circuit 125 (see FIG. 7A). For example, wait states can be added after first and second soft brake steps (steps 1920 and 1940, respectively) to provide light load performance. More specifically, when load 115 (see FIG. 7A) requires a reduced amount of current and/or voltage, after first softbrake (step 1920) a wait state can be commanded where first and fourth solid-state switches, M1 and M4, respectively are on and second and third solid-state switches, M2 and M3 are off. This essentially halts current flow through circuit 125 to load 115 (see FIG. 7A) until the subsequent preflux step 1925 is commanded. Similarly, after second soft brake (step 1940) a second wait state can be commanded where second and third solid-state switches, M2 and M3, respectively, are on and first and fourth solid-state switches, M1 and M4, respectively, are off. This state essentially halts current flow through circuit 125 until the subsequent preflux step 1905 is commanded.

In some embodiments a comparator control circuit can be included as a portion of the phaser circuit. More specifically, a comparator control circuit can use Vout and the clock signal to only allow the phaser to execute a phase if Vout is below a predetermined voltage and a clock signal is received from the Voltage to Time circuit. This feature can protect against the phaser sending trigger signals to one or more phases if Vout is above the predetermined voltage but due to transients or bandwidth limitations of the control circuit one or more clock signals are sent. Because Vout is above the predetermined voltage no phases will be triggered.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Though the present invention is disclosed by way of specific embodiments as described above, those embodiments are not intended to limit the present invention. Based on the methods and the technical aspects disclosed herein, variations and changes may be made to the presented embodiments by those of skill in the art without departing from the spirit and the scope of the present invention.

What is claimed is:

1. A system comprising:
   a substrate;
   a first semiconductor die disposed on the substrate and including a load circuit and an error signal generation circuit; and
   a second semiconductor die disposed on the substrate and including a power converter circuit arranged to deliver power to the load circuit, the power converter circuit including a plurality of power switches coupled to a control circuit;
   wherein the control circuit receives an error signal from the error signal generation circuit and in response controls a power delivered to the load circuit via the plurality of power switches.

2. The system of claim 1, wherein the power converter circuit is coupled to the load circuit at a node and wherein the error signal represents a difference between a regulated voltage at the node and a reference voltage.

3. The system of claim 2, wherein the error signal represents the difference and the reference voltage multiplied by again factor.

4. The system of claim 2, further comprising a reference voltage generator configured to generate the reference voltage, wherein the error signal represents the difference and the reference voltage and wherein the reference voltage generator is integrated on the first semiconductor die.

5. The system of claim 1, wherein the error signal is an analog voltage.

6. The system of claim 1, wherein the error signal is a digital value.

7. The system of claim 1, wherein the error signal generation circuit comprises an analog-to-digital converter configured to generate the error signal.

8. The system of claim 1, wherein the power converter circuit comprises a capacitor connected to the load circuit, wherein the capacitor is integrated on the first semiconductor die.

9. The system of claim 1, wherein the power converter circuit comprises one or more inductors connected to the load circuit, wherein the inductors are formed on the substrate separate from the first and second semiconductor die.

10. The system of claim 1, wherein the plurality of power switches are integrated on the second semiconductor die.

11. The system of claim 1, wherein the power converter circuit comprises:
a capacitor connected to the load circuit; and
one or more inductors connected to the load circuit;
wherein the plurality of power switches, the capacitor, and the one or more inductors collectively form a voltage regulator.

12. The system of claim 11, wherein the voltage regulator is multiphase.

13. A method of forming a system, the method comprising:
attaching a first semiconductor die to a substrate, the first semiconductor die including a load circuit and an error signal generation circuit; and
attaching a second semiconductor die to the substrate, the second semiconductor die including a power converter circuit arranged to deliver power to the load circuit, the power converter circuit including a plurality of power switches coupled to a control circuit;
wherein the control circuit receives an error signal from the error signal generation circuit and in response controls a power delivered to the load circuit via the plurality of power switches.

14. The method of claim 13, wherein the power converter circuit is coupled to the load circuit at a node and wherein the error signal represents a difference between a regulated voltage at the node and a reference voltage.

15. The method of claim 14, wherein the error signal represents the difference and the reference voltage multiplied by again factor.

16. The method of claim 13, wherein the error signal is an analog voltage.

17. The method of claim 13, wherein the error signal is a digital value.

18. The method of claim 13, wherein the error signal generation circuit comprises an analog-to-digital converter configured to generate the error signal.

19. The method of claim 13, wherein the power converter circuit comprises a capacitor connected to the load circuit, wherein the capacitor is integrated on the first semiconductor die.

20. The method of claim 13, wherein the power converter circuit comprises one or more inductors connected to the load circuit, wherein the inductors are formed on the substrate separate from the first and second semiconductor die.

* * * * *

UNITED STATES PATENT AND TRADEMARK OFFICE
CERTIFICATE OF CORRECTION

| | | |
|---|---|---|
| PATENT NO. | : 11,601,059 B2 | Page 1 of 1 |
| APPLICATION NO. | : 17/811042 | |
| DATED | : March 7, 2023 | |
| INVENTOR(S) | : Lidsky | |

It is certified that error appears in the above-identified patent and that said Letters Patent is hereby corrected as shown below:

On the Title Page

Item (73) Assignee, Please change "Navitas Semiconductor Limited" to --Empower Semiconductor, Inc.--.

Signed and Sealed this
Seventh Day of October, 2025

John A. Squires
*Director of the United States Patent and Trademark Office*